(12) United States Patent
Curtis et al.

(10) Patent No.: US 6,209,419 B1
(45) Date of Patent: *Apr. 3, 2001

(54) TWIN MASS FLYWHEEL FRICTION DAMPING DEVICE

(75) Inventors: Anthony John Curtis; Robert John Murphy, both of Leamington Spa (GB)

(73) Assignee: Automotive Products, PLC, Leamington Spa (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,658

(22) PCT Filed: Mar. 21, 1996

(86) PCT No.: PCT/GB96/00675

§ 371 Date: Sep. 11, 1997

§ 102(e) Date: Sep. 11, 1997

(87) PCT Pub. No.: WO96/29525

PCT Pub. Date: Sep. 26, 1996

(30) Foreign Application Priority Data

Mar. 21, 1995 (GB) .................................. 9505750

(51) Int. Cl.[7] ..................................... F16F 15/10
(52) U.S. Cl. .................. 74/574; 192/89.25; 192/210.1
(58) Field of Search ............................ 192/89.25, 210, 192/210.1, 214, 214.1, 213.12, 213.22, 213.31, 70.19, 213.11, 213.3; 464/68, 160; 74/574; 267/161, 162, 163

(56) References Cited

U.S. PATENT DOCUMENTS

| | | | |
|---|---|---|---|
| 3,483,888 | * 12/1969 | Wurzel | 267/161 |
| 3,788,429 | * 1/1974 | Brooks et al. | 192/70.19 |
| 4,101,015 | * 7/1978 | Radke | 192/213.2 |
| 4,300,669 | * 11/1981 | Browne | 267/161 |
| 4,416,643 | * 11/1983 | Braun et al. | 464/38 |
| 4,537,579 | * 8/1985 | Loizeau | 192/210.1 |
| 4,852,424 | * 8/1989 | Grassmuck et al. | 192/210.1 |
| 4,856,638 | * 8/1989 | Roth et al. | 192/214.1 |
| 4,906,220 | * 3/1990 | Worner et al. | 192/214.1 |
| 4,944,712 | * 7/1990 | Worner et al. | 464/68 |
| 5,070,979 | 12/1991 | Ohtsuka et al. | 192/54 |
| 5,072,818 | * 12/1991 | Kuhne | 192/214.1 |
| 5,180,335 | * 1/1993 | Maucher et al. | 464/68 |
| 5,362,276 | * 11/1994 | Fuehrer et al. | 464/68 |
| 5,374,218 | * 12/1994 | Reik et al. | 192/213.21 |
| 5,529,161 | * 6/1996 | Ament et al. | 192/213.31 |
| 5,759,105 | * 6/1998 | Bochet et al. | 192/214 |
| 5,772,516 | * 6/1998 | Bonfilio | 192/213.31 |
| 5,913,397 | * 6/1999 | Okada et al. | 192/70.19 |
| 5,934,654 | * 8/1999 | Mokdad et al. | 192/213.3 |

FOREIGN PATENT DOCUMENTS

| | | | |
|---|---|---|---|
| 2127131 | * 4/1984 | (GB) | 464/68 |
| 2135427 | 8/1984 | (GB) | . |

* cited by examiner

Primary Examiner—David A. Bucci
Assistant Examiner—Chong H. Kim
(74) Attorney, Agent, or Firm—Paul E Milliken; Ray L Weber; Lee A Germain

(57) ABSTRACT

A friction damping device (50) capable of generating friction torque for controlling the relative rotation of a first and a second flywheel mass of the twin mass flywheel (10), the friction damping device comprising a first (62) and a second (51) friction member operatively connected with one flywheel mass (12) via a common drive formation (cdf) which forms part of the second friction member. A third friction member (56) is sandwiched between the first and second friction members and is operatively connected with the other flywheel mass (11), and actuating means (61, 67) is operative to axially displace the first and second friction members relative to each other to modify the friction generated by the device upon rotation of the third friction member relative to the first or second friction members resulting from relative rotation of the flywheel masses.

29 Claims, 19 Drawing Sheets

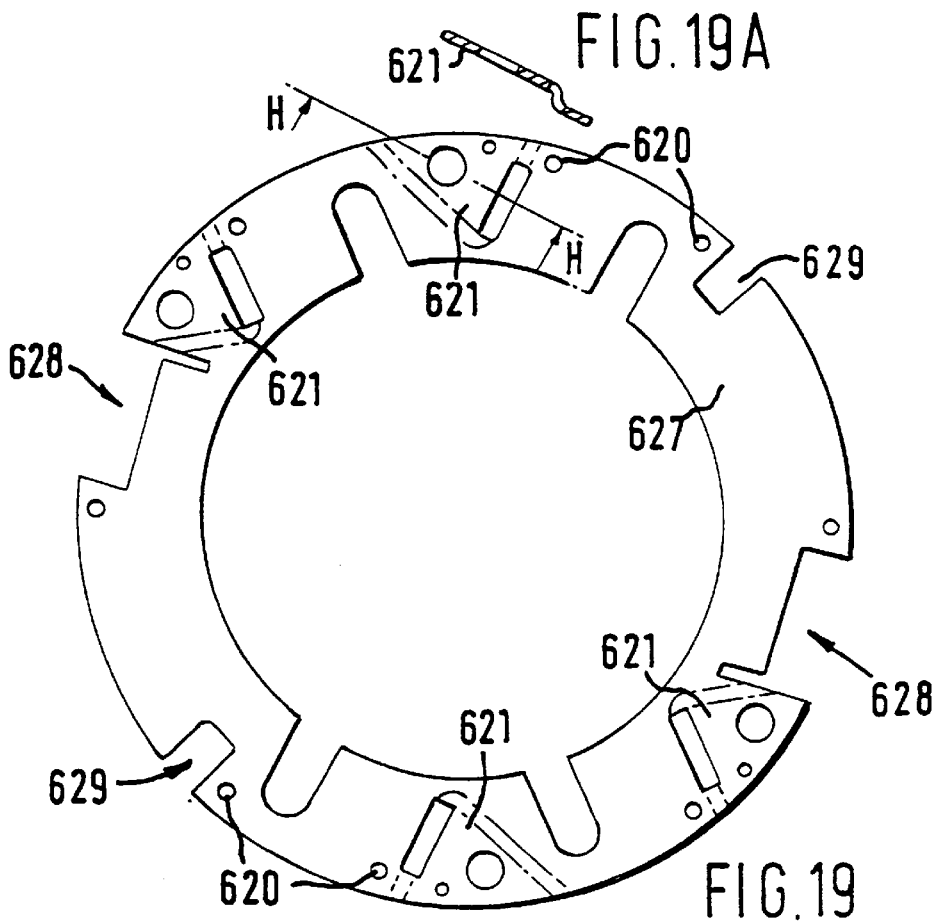
FIG. 19A
FIG. 19
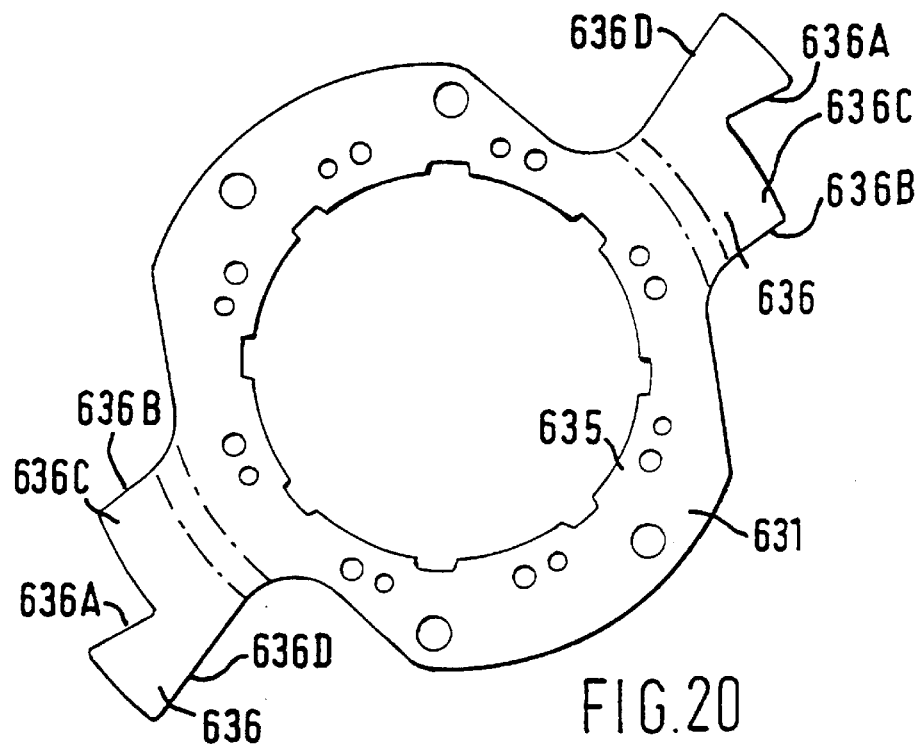
FIG. 20

TWIN MASS FLYWHEEL FRICTION DAMPING DEVICE

The present invention relates to a friction damping device which controls the relative rotation between first and second flywheel masses of a twin mass flywheel as used in a motor vehicle transmission assembly.

Typically such a motor vehicle transmission assembly has an engine for driving one flywheel mass, and a gear box which is driven by the other flywheel mass. The two flywheel masses can rotate relative to each other to a limited extent and have drive torque means acting between them which progressively resist relative rotation of the flywheel masses as the torque increases (i.e. at low torque levels the flywheel masses do not rotate significantly relative to each other but at higher torque levels, at the same engine speed, the flywheel masses rotate a greater amount relative to each other). Such drive torque means can be springs (well known in the art) or bob weights as shown, for example, in the Applicant's prior patent application GB91 02029.1. Damping devices are also provided which damp out fluctuations in relative rotation between the flywheel masses.

In some such vehicle transmission assemblies when the engine is idling, i.e. in the idle range, irregular low level torque fluctuations from the engine can be transmitted to the gear box and cause problems such as gear idle chatter. To cure such problems the damping device must produce a relatively low level of damping in the idle range.

When the engine produces a relatively higher mean level of torque and a gear has been selected and the vehicle is being driven by the engine (i.e. the vehicle is in the drive range and the relative rotation of the flywheel masses is in the drive direction) the flywheel masses can approach the limit of their relative rotation. Because the engine produces uneven torque output which fluctuates alternately above and below the mean level, these fluctuations can cause the flywheel masses to rattle against the stops which limit their relative rotation. To cure this problem the damping device needs to produce a relatively higher level of damping in the drive range. Since it is possible for the inertia of the vehicle to drive the engine i.e. the engine can be in the over-run range and the relative rotation of the flywheel masses is in the opposite over-run direction, the damping device needs to operate in both directions of relative rotation. Traditionally such damping devices are friction type devices.

It is an object of the present invention to provide an improved form of friction damping device for a twin mass flywheel.

It is a further object of the present invention to provide a friction damping device to control the relative rotation between the flywheel masses near a limit of relative rotation of the flywheel masses.

Thus in accordance with the present invention there is provided a twin mass flywheel having friction damping device capable of generating friction torque for controlling the relative rotation of a first and a second flywheel mass of the twin mass flywheel, the friction damping device comprising a first and a second friction member rotationally connected with an associated one of the flywheel masses, a third friction member sandwiched between the first and second friction members and which is rotationally connected with the other flywheel mass, and actuating means operative to axially displace the first and second friction members, relative to each other to modify the friction generated by the device upon rotation of the third friction member relative to the first or second friction members the second friction member having at least one first axially oriented portion operatively connected with the first friction member, each first axially orientated portion being in the form of a pronged fork with circumferentially outer surfaces of the prongs acting as a common drive formation for connecting the first and second friction members with said one flywheel mass by engaging torque transmitting abutments on side one flywheel mass with formations on the first friction member engaging between the prongs of the second friction member.

Also in accordance with the present invention there is provided a twin mass flywheel having a friction damping device for controlling the relative rotation of a first and a second flywheel mass of the twin mass flywheel, the friction damaging device comprising a substantially U-shaped clip with a base portion and two arm portions fixed rotationally fast with one flywheel mass, and a flange fixed rotationally fast with the other flywheel mass, the flange contacting and generating a frictional force with the arms of the U-shaped clip after a predetermined amount of relative rotation of the flywheel masses.

Also in accordance with the present invention there is provided a twin mass flywheel having a friction damping device for controlling the relative rotation of a first and a second flywheel mass of a twin mass flywheel, the friction damping device comprising a first friction component which rotates with the first flywheel mass and a second friction component which rotates with the second flywheel mass, the first and second friction components being biased into engagement to generate a friction damping force by a belleville spring and having co-operating surface formations arranged such that during relative rotation of the flywheel masses the belleville spring is compressed, a first surface of the belleville spring contacting a surface of a first adjacent component at an outer contact radius and a second surface of the belleville spring contacting a surface of a second adjacent component at an inner contact radius, at least one of the contacting surfaces being curved so that the ratio of the outer contact radius to the inner contact radius changes as the belleville spring is compressed.

Also in accordance with the present invention there is provided a twin mass flywheel having a friction damping device for controlling the relative rotation of a first and a second flywheel mass of the twin mass flywheel, the friction damping device comprising a first friction component which rotates with the first flywheel mass and a second friction component which rotates with the second flywheel mass, the first and second friction components being biased into engagement to generate a friction damping force by a belleville spring and having co-operating surface formations arranged such that during relative rotation of the flywheel masses the belleville spring is compressed, a first surface of the belleville spring contacting an associated surface of a first adjacent component at an outer contact radius and a second surface of the belleville spring contacting an associated surface of a second adjacent component at an inner contact radius, at least one of the contacting surfaces being provided with protrusions which are brought into contact with an associated other of the contacting surfaces during compression of the belleville spring such that the ration of the outer contact radius to the inner contact radius undergoes a step change after a predetermined amount of relative rotation of the two flywheel masses.

Also in accordance with the present invention there is provided a twin mass flywheel having a friction damping device for controlling the relative rotation of a first and a second flywheel mass of the twin mass flywheel, the friction damping device comprising a first friction component which rotates with the first flywheel mass and a second friction component which rotates with the second flywheel mass, the first and second friction components being biased into engagement to generate a friction damping force by a belleville spring and having co-operating surface formations arranged such that during relative rotation of the flywheel masses the belleville spring is compressed, a first surface of the belleville spring contacting a surface of a first adjacent component at an outer contact radius and a second surface of the belleville spring contacting a surface of a second adjacent component at an inner contact radius, the surface of the second adjacent component at the inner contact radius being curved so that the ratio of the outer contact radius to the inner contact radius changes as the belleville spring is compressed.

The present invention will now be described, by way of example only, with reference to the accompanying drawings in which.

Figure 8A:
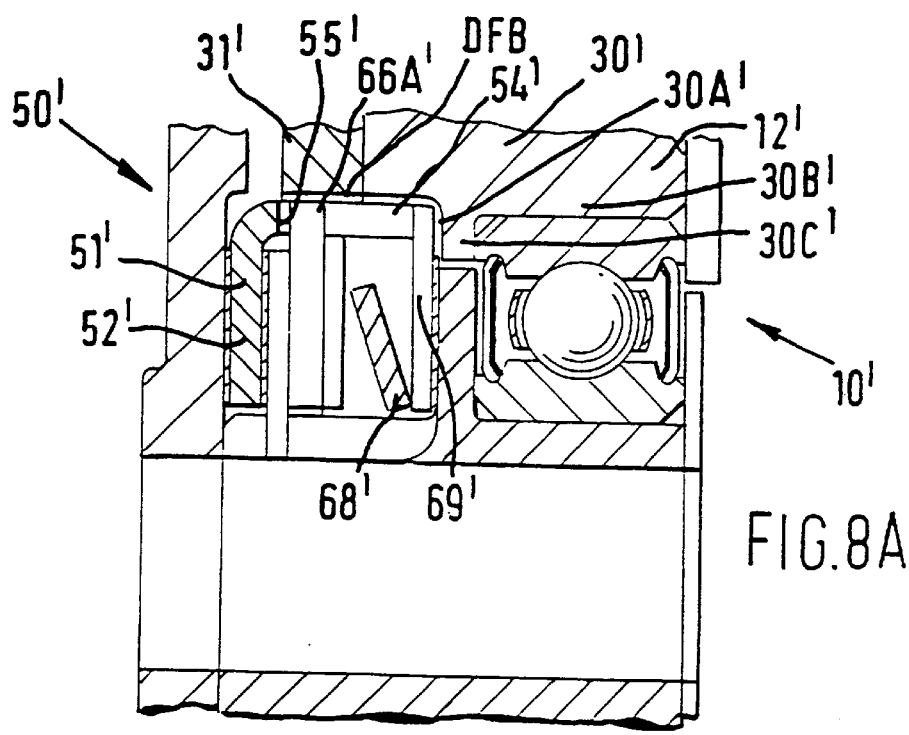
Figure 7:
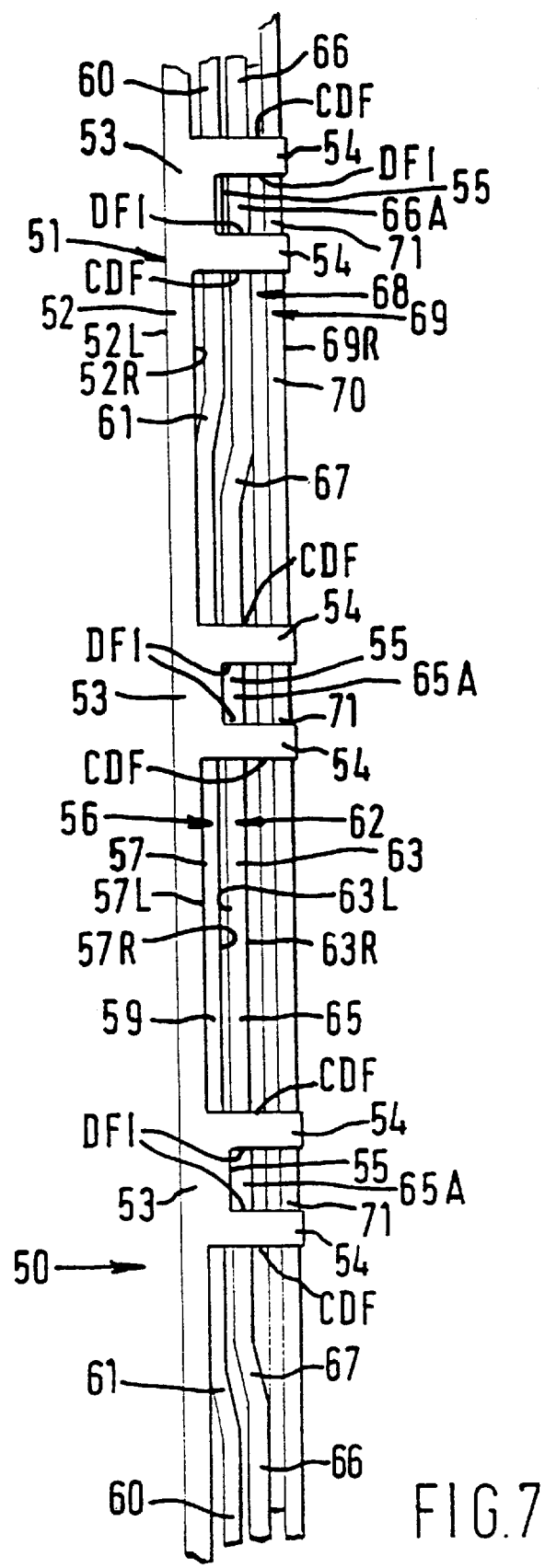
FIG. 7 is a developed circumferential view of the friction damping device taken along the line ZZ of FIG. 3.
Figure 7A:
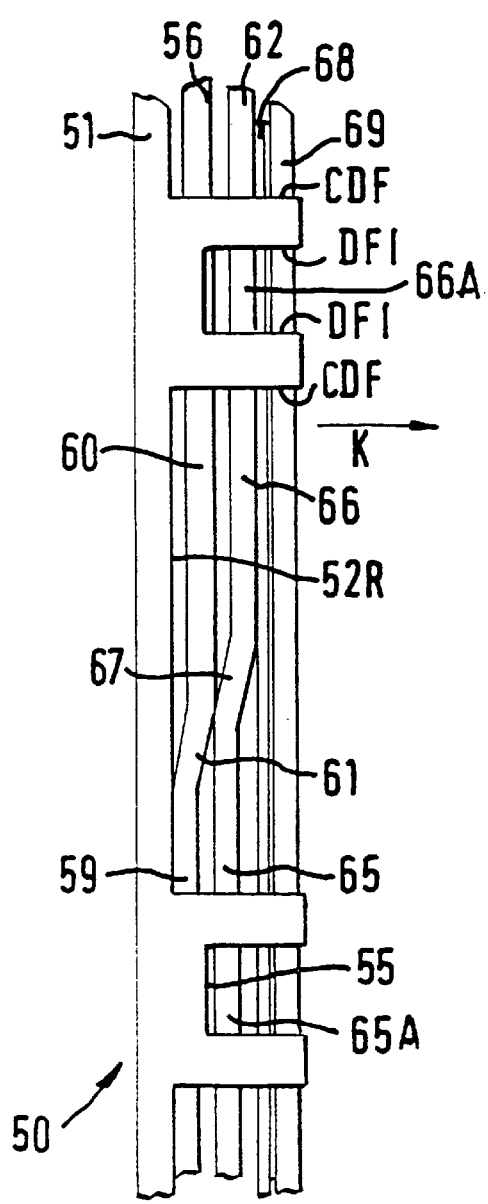
Figure 7B:
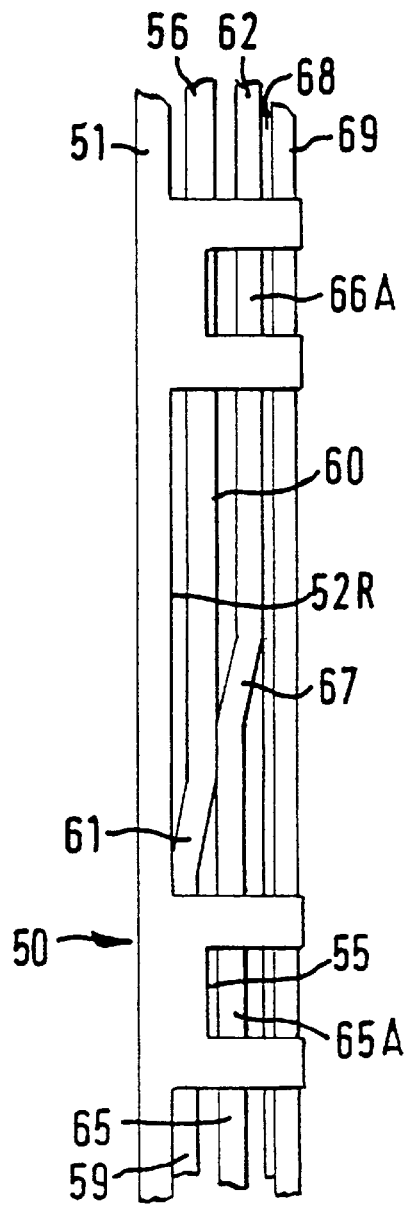
Figure 8B:
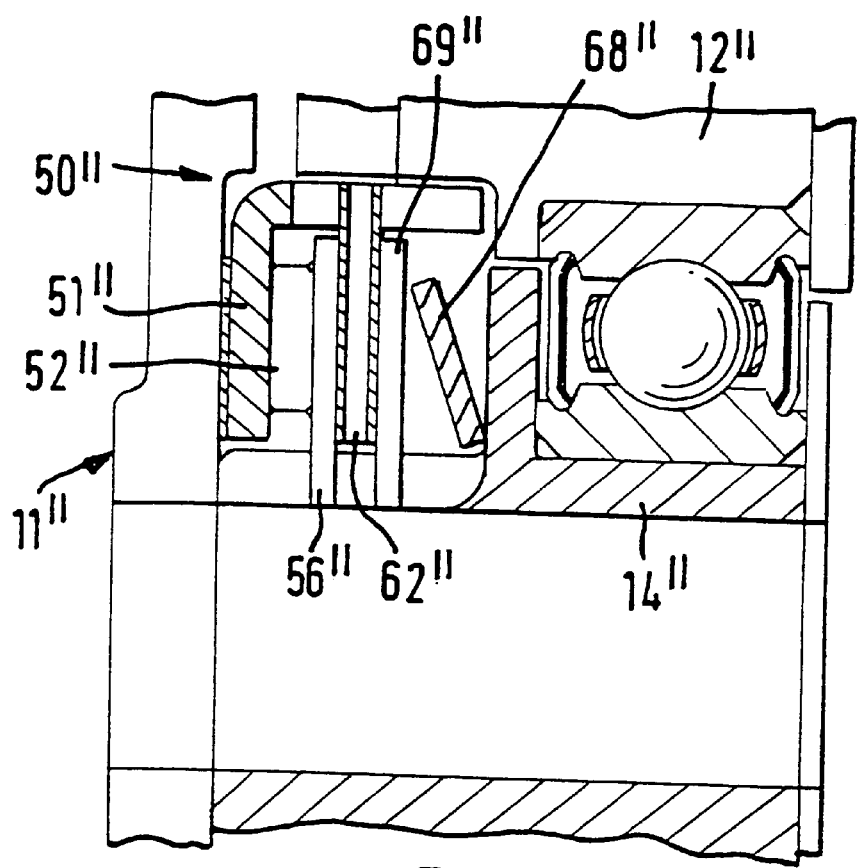
Figure 9:
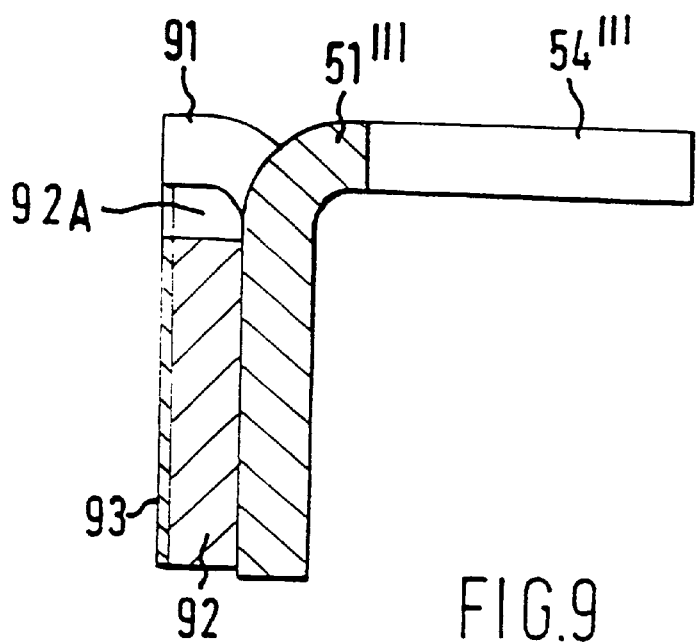
Figure 10:
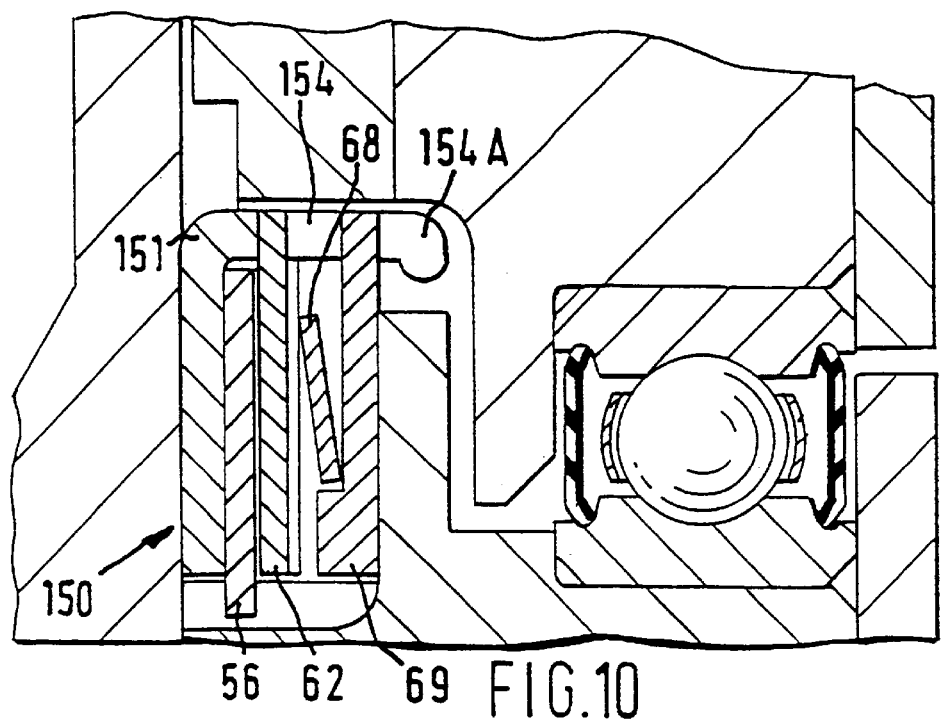
Figures 11, 11A:
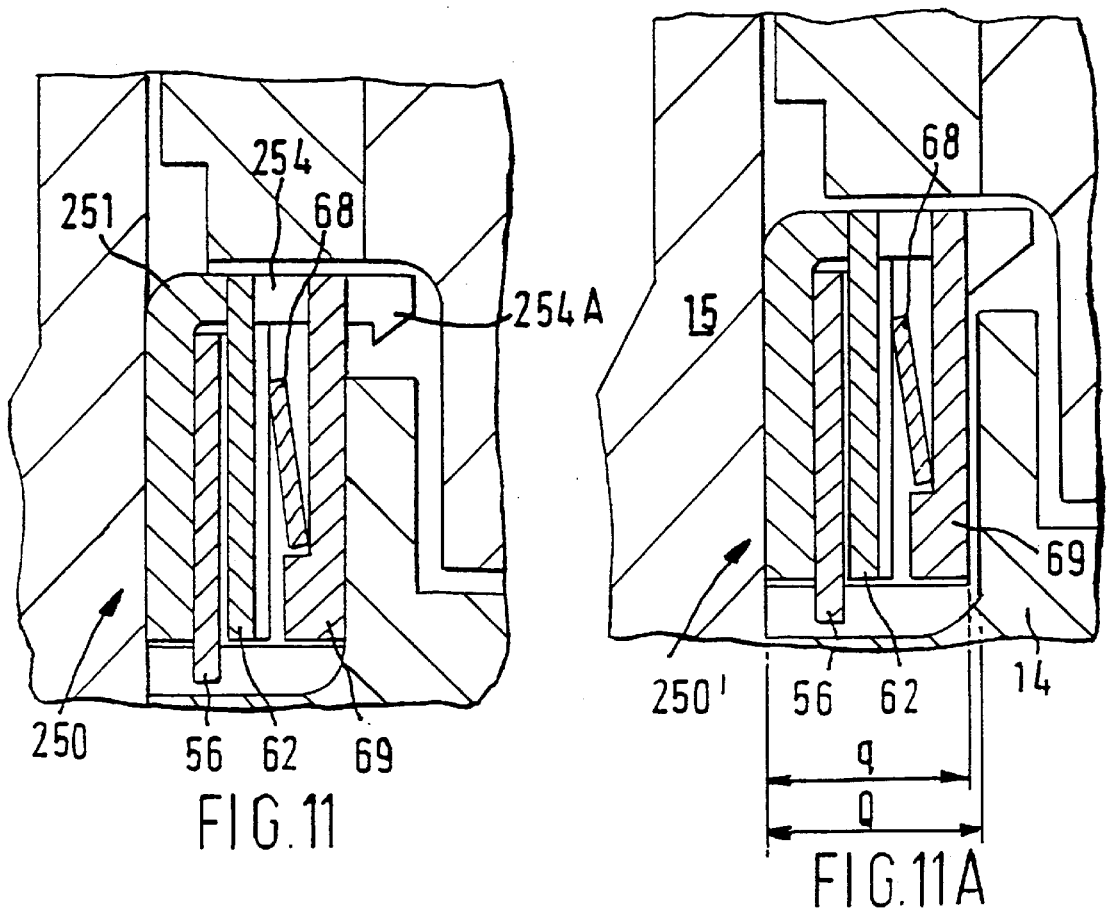
Figure 12:
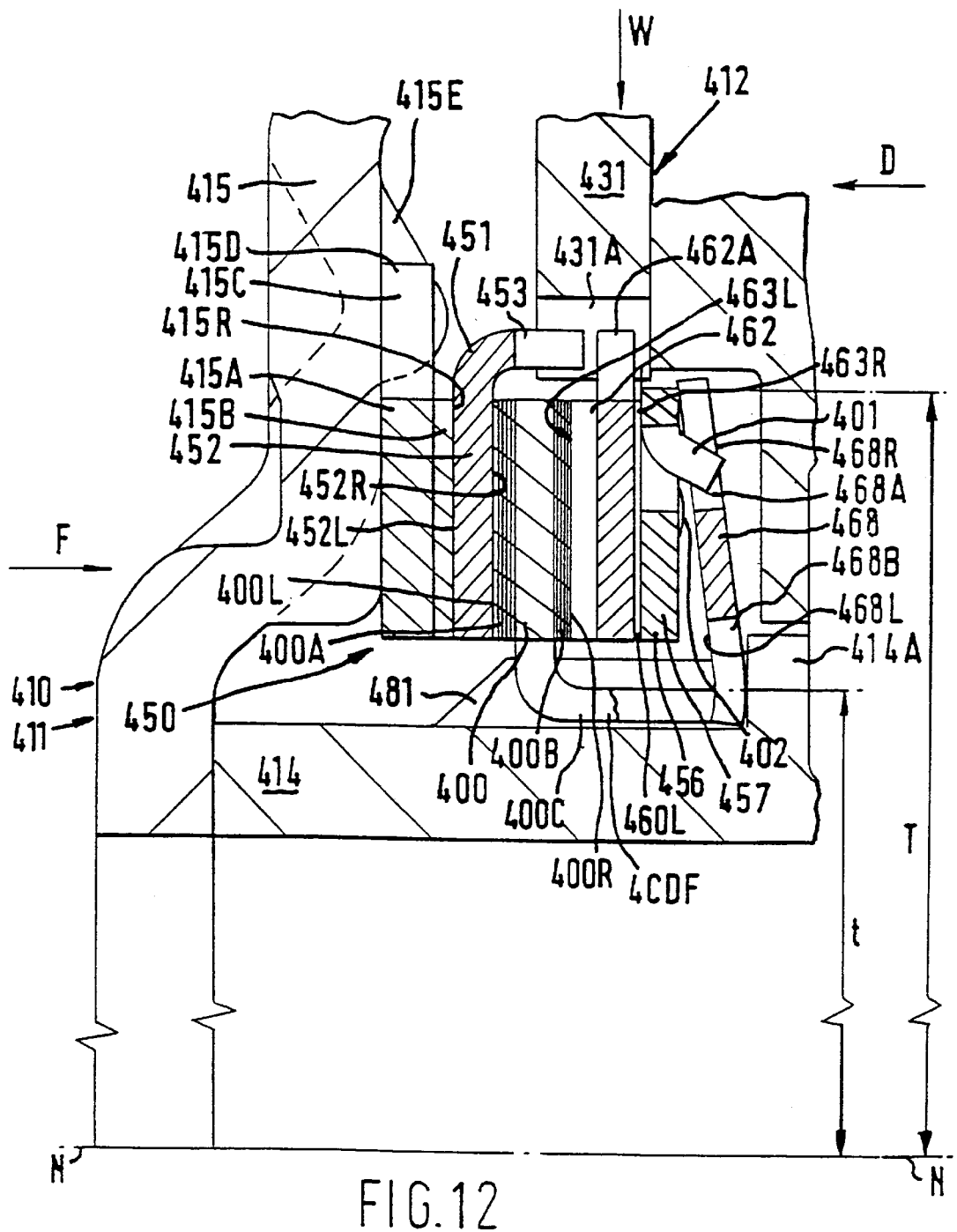
Figure 12A:
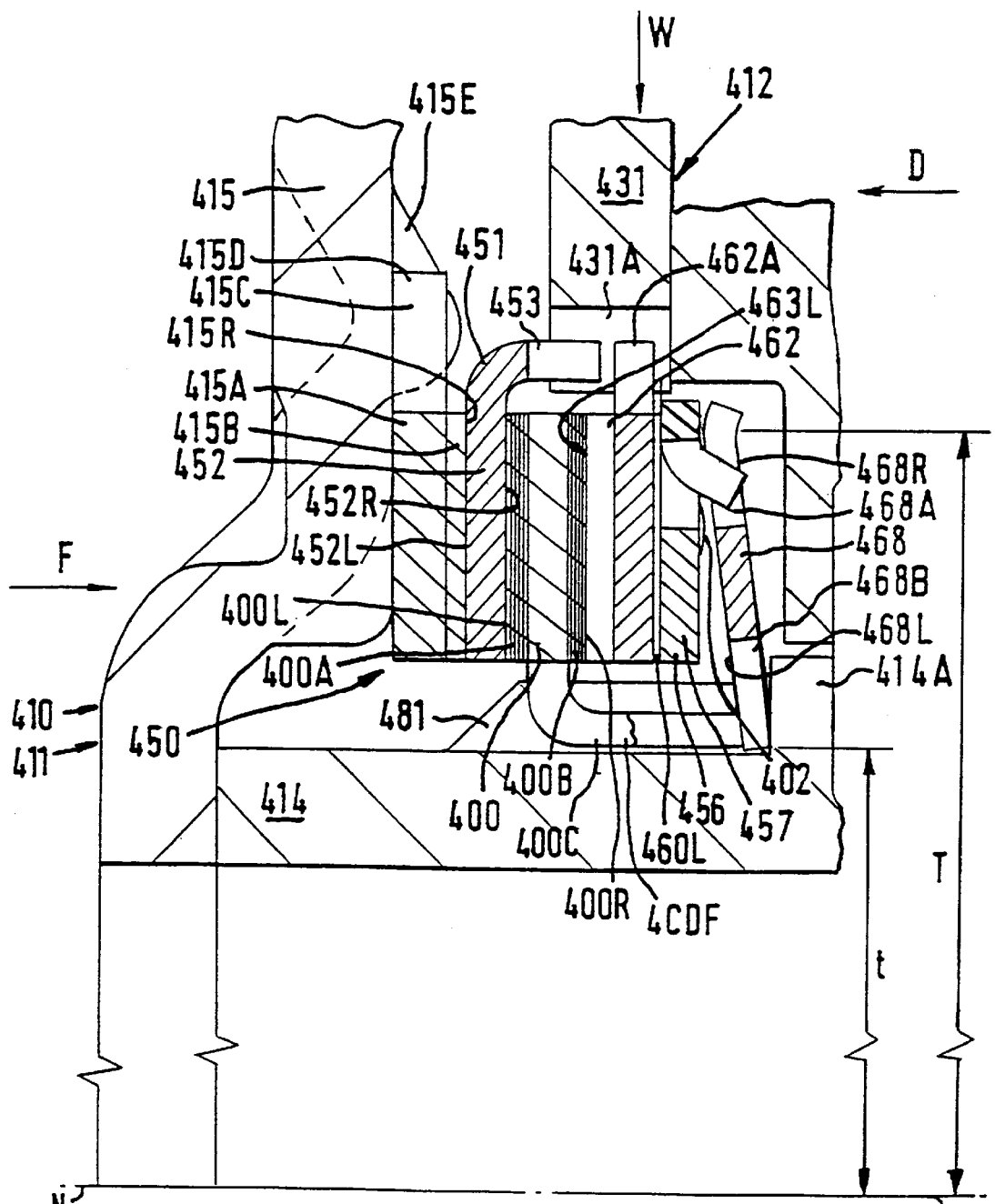
Figure 12B:
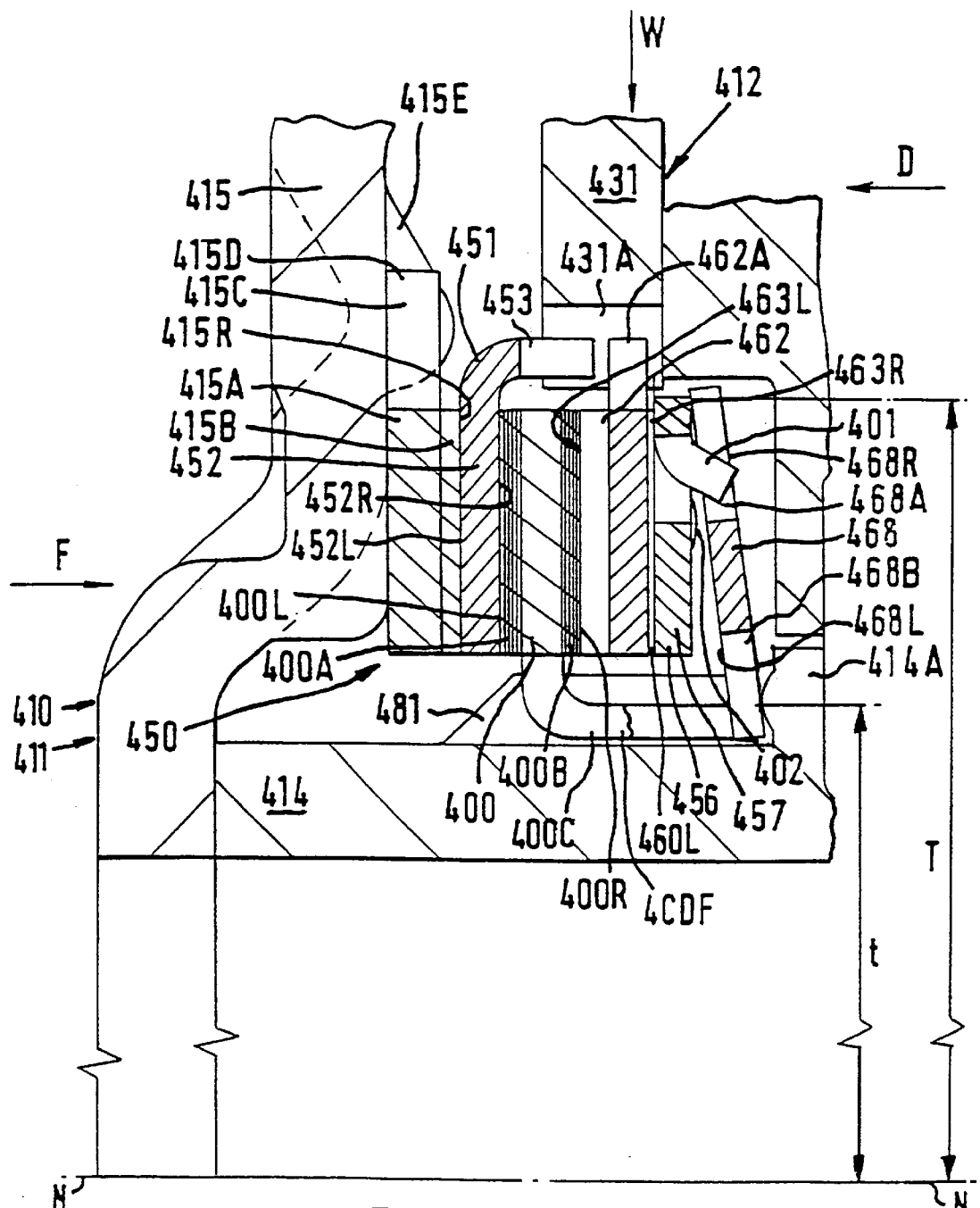
Figure 13:
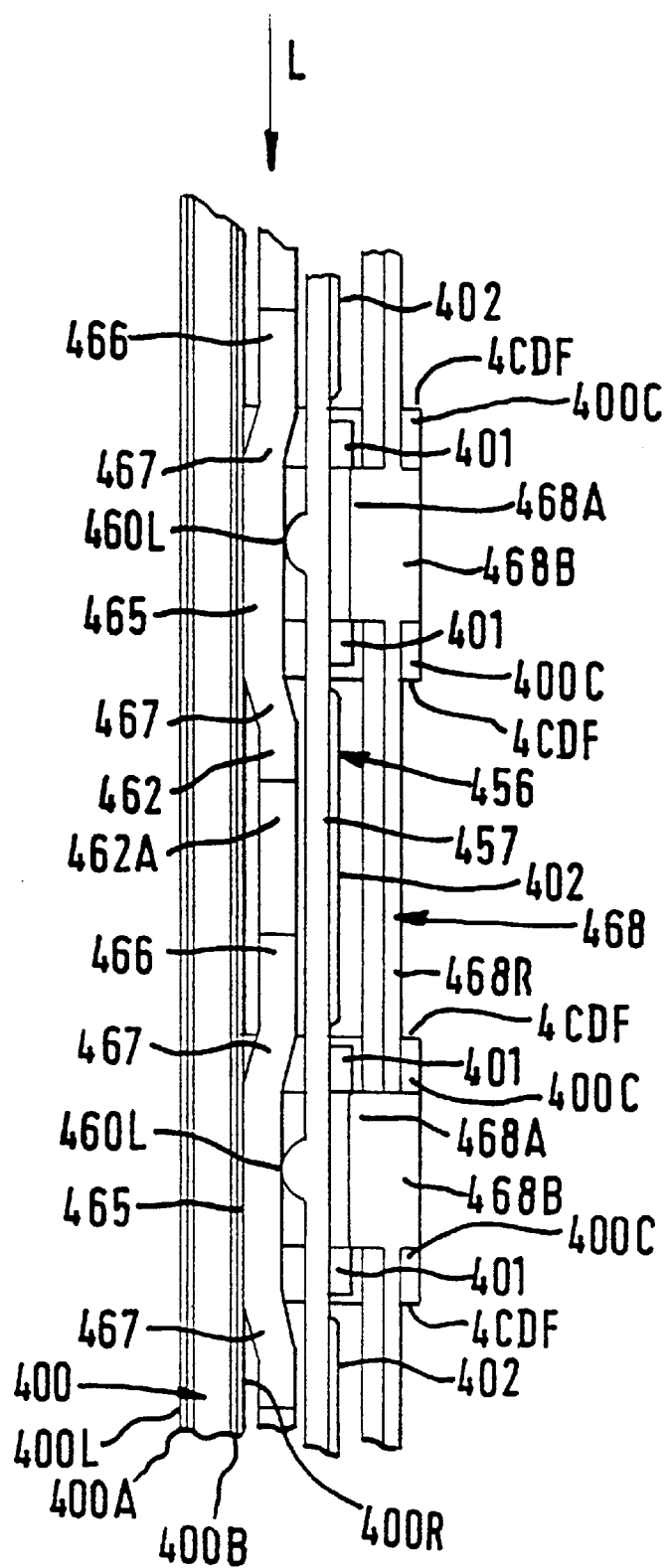

FIG. 7A is a large scale view of part of FIG. 7 showing the friction damping device 50 in a position corresponding to a second range of relative rotation between the flywheel masses 11 and 12;

FIG. 7B is a large scale view of part of FIG. 7 showing the friction damping device 50 in a position corresponding to a third range of relative rotation between the flywheel masses 11 and 12;

FIGS. 8A, and 8B show modified friction damping devices;

FIG. 9 shows a modified second friction member;

FIG. 10 is a radial cross section of a further form of damping damping in accordance with the invention;

FIG. 11 is a radial cross section of a further form of damping device in accordance with the invention;

FIG. 11A is a radial cross section of a modified form of the damping device of FIG. 11;

FIG. 12 is a radial cross section of a still further form of damping device in accordance with the invention;

FIGS. 12A and 12B show slightly different varations of the embodiment of FIG. 12;

FIG. 13 is a developed radial view of the friction device in FIG. 12 looking in the direction of arrow W.

Figure 14:
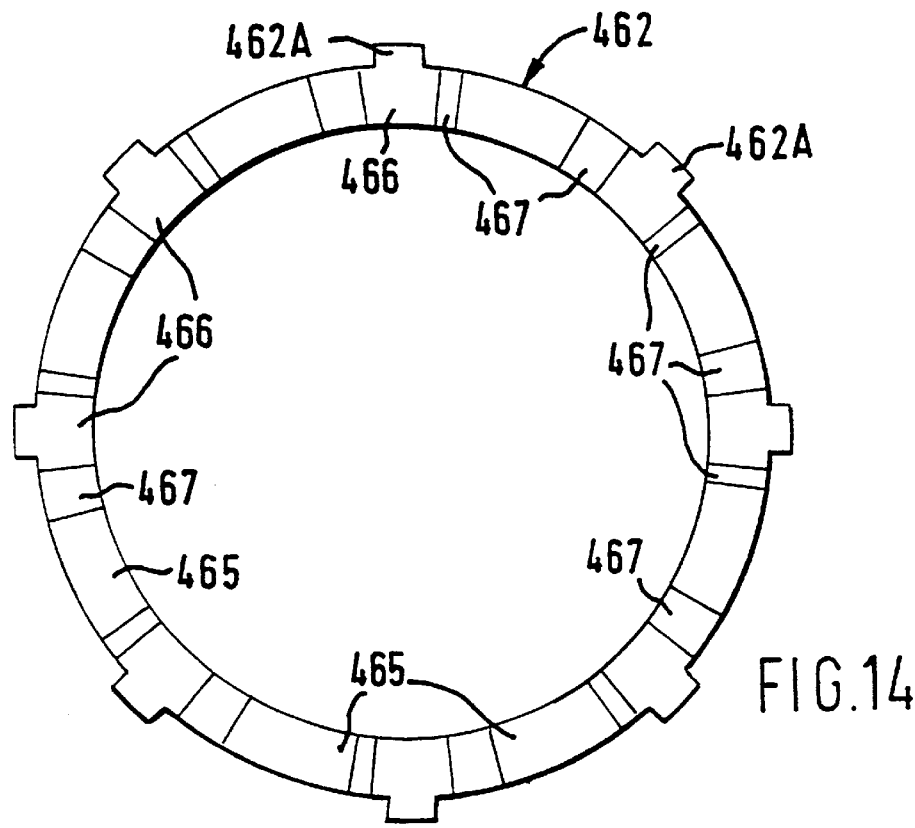
Figure 15:
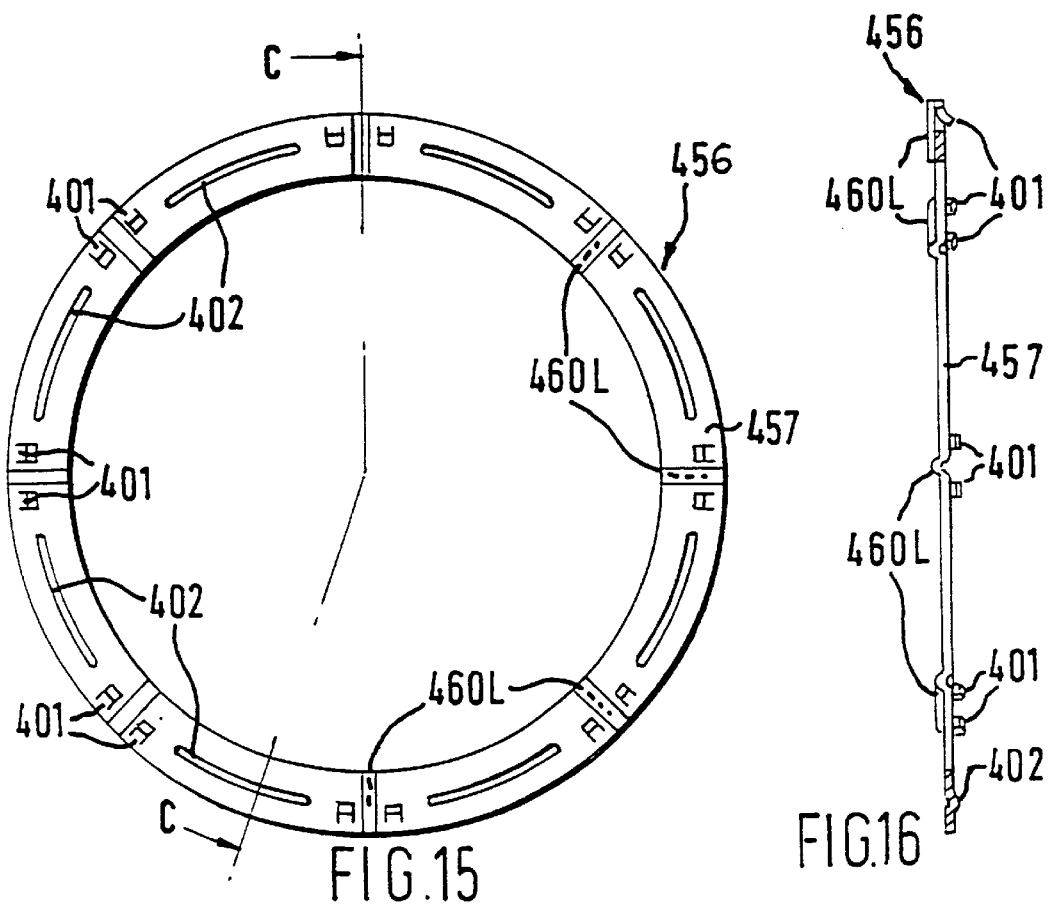
Figure 16:
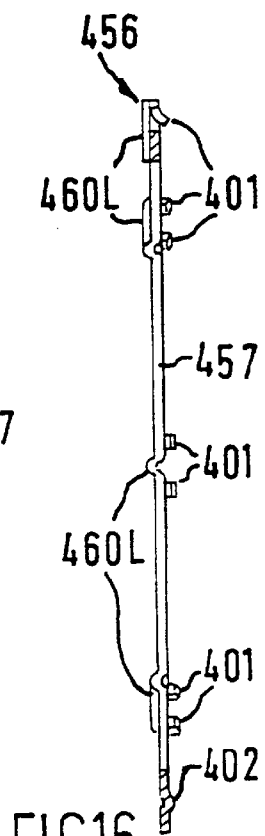
Figure 17:
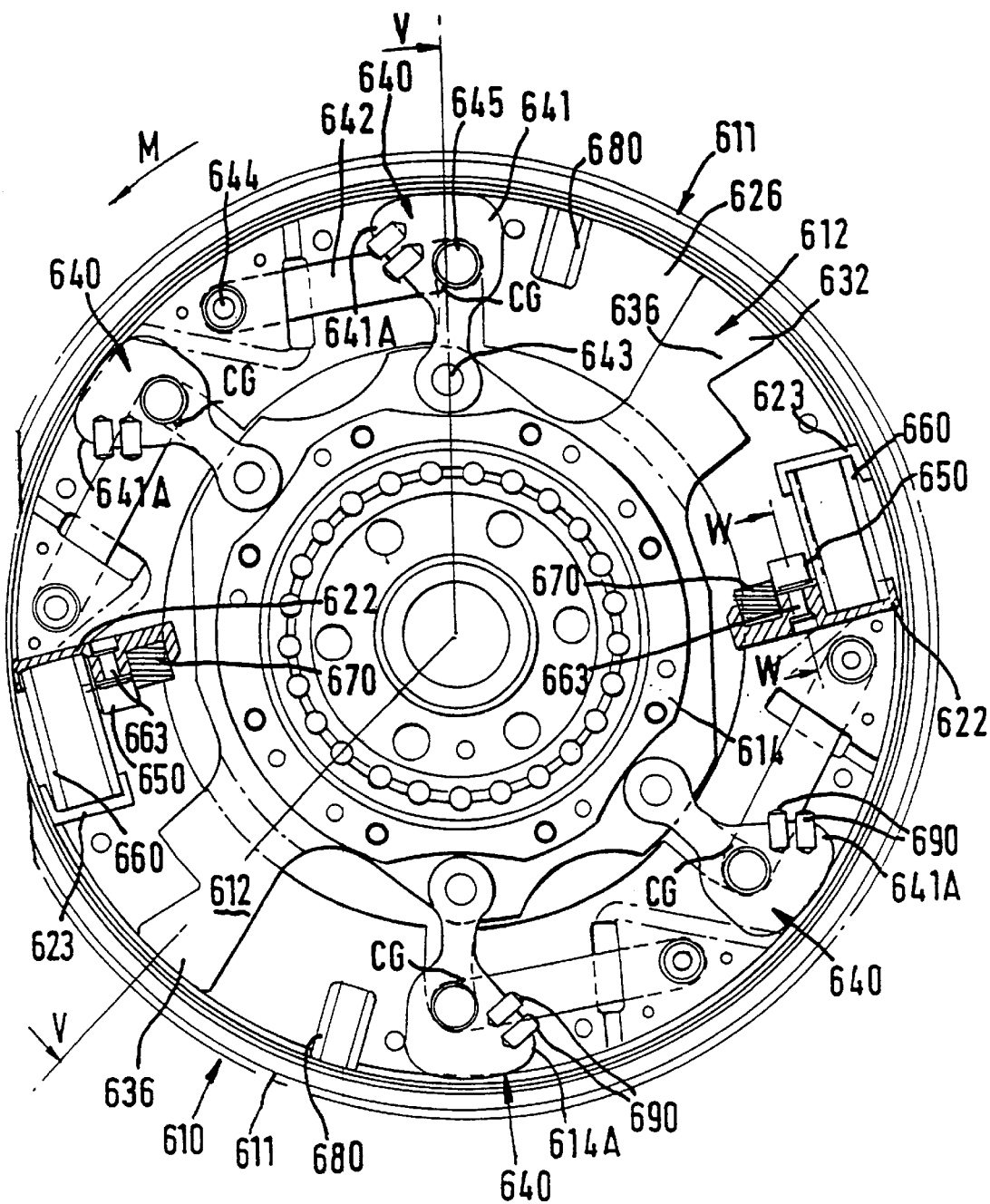
Figure 18:
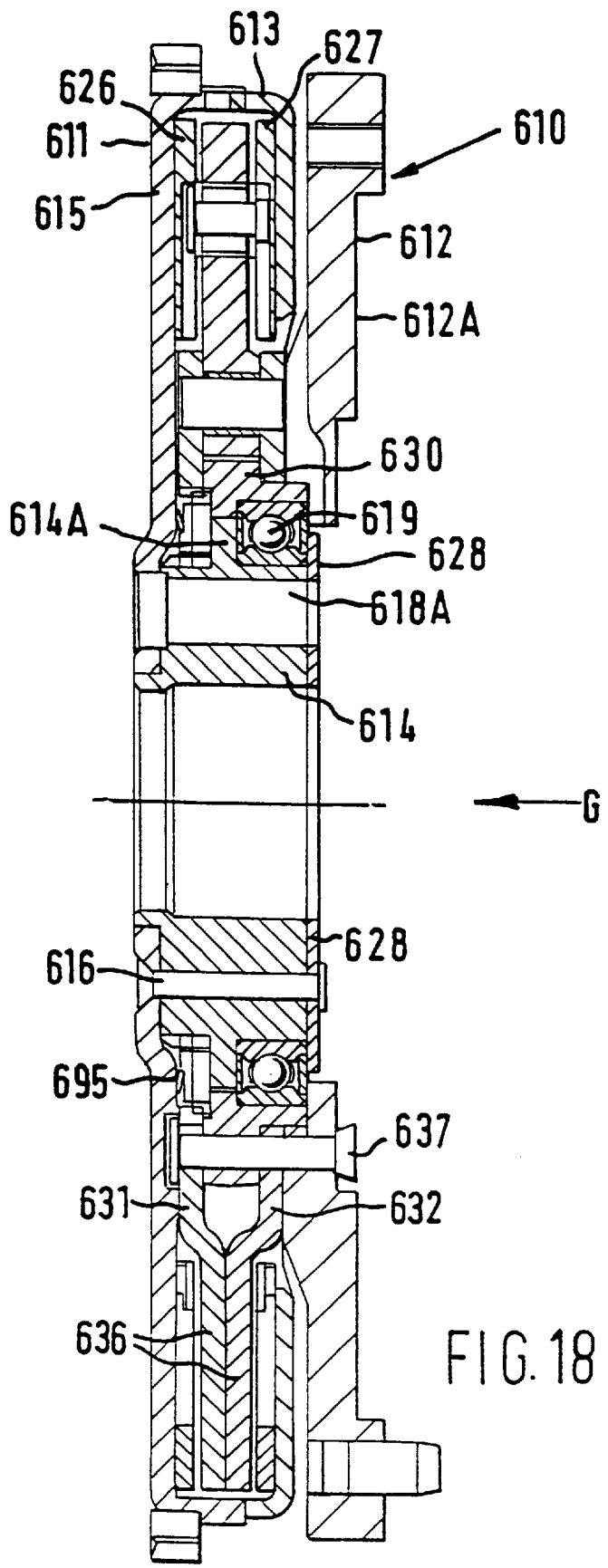

FIG. 14 is an axial view of a third friction member of FIG. 12 taken in the direction of arrow F;

FIG. 15 is an axial view of a first friction member of FIG. 12 taken in the direction of arrow D;

FIG. 16 is a radial cross section of the first friction washer of FIG. 15 taken along the line CC;

FIG. 17 is an axial cut away view of a twin mass flywheel in a geometrically neutral position incorporating a still further form of a friction damping device according to the present invention taken in the direction of arrow G of FIG. 18 looking towards an associated crankshaft;

FIG. 18 is a radial cross section taken along the line V—V of FIG. 17;

FIG. 19 is an axial view of a side plate taken in the direction of arrow G of FIG. 18;

FIG. 19A is a partial view of the side plate of FIG. 19 taken along the line H—H.

Figure 21:
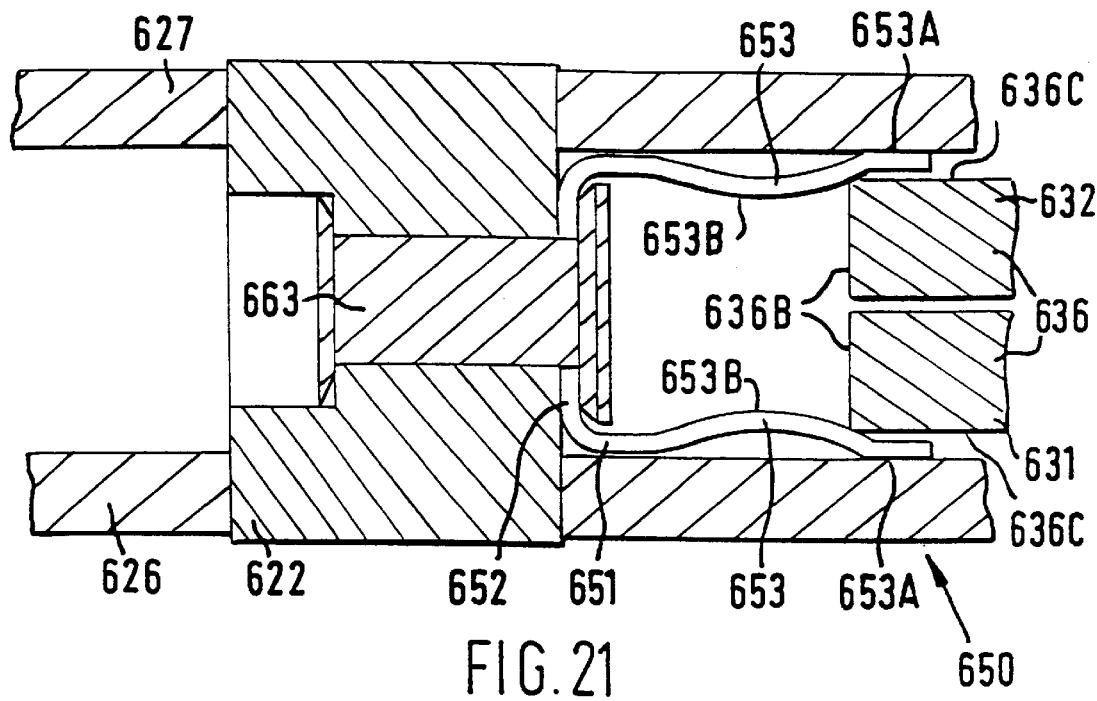
Figure 22:
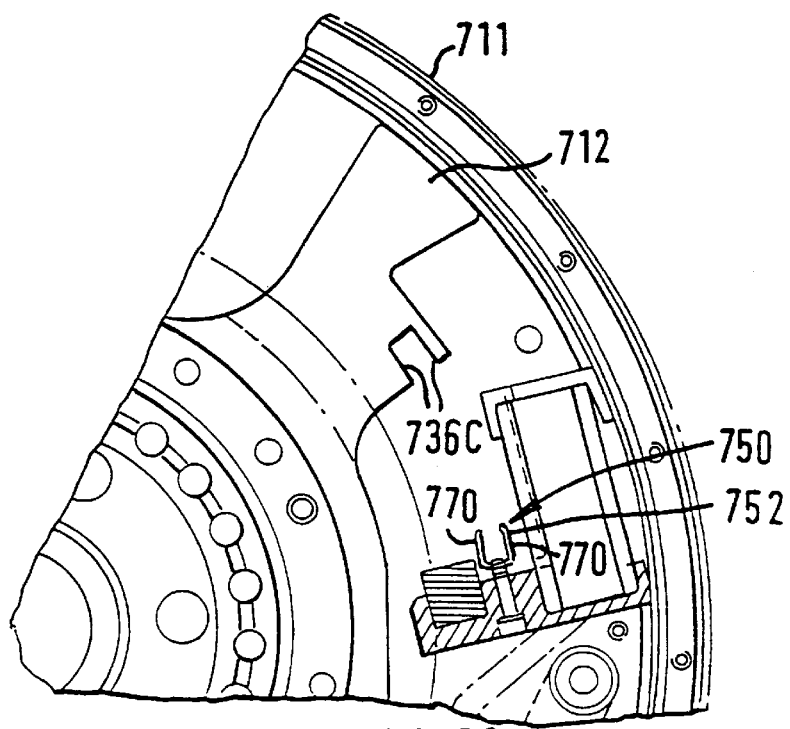

FIG. 20 is an axial view of a flange plate taken in the direction of arrow G of FIG. 18;

FIG. 21 is a radial section view taken along the line W—W of FIG. 17;

FIG. 22 is a partial axial view of a modified form of the friction damping device of FIG. 17.

With reference to FIGS. 1 to 7B of the accompanying drawings there is illustrated a twin mass flywheel 10 which is formed from two flywheel masses 11 and 12.

One flywheel mass 11 (also known as an input flywheel mass) is fixed to a crankshaft (not shown) of an internal combustion engine by way of a central hub 14 and bolts 18. In use a friction clutch (not shown) is secured to the second flywheel mass 12 (also known as an output flywheel mass) to connect the second mass with an associated gearbox (not shown).

Figure 1:
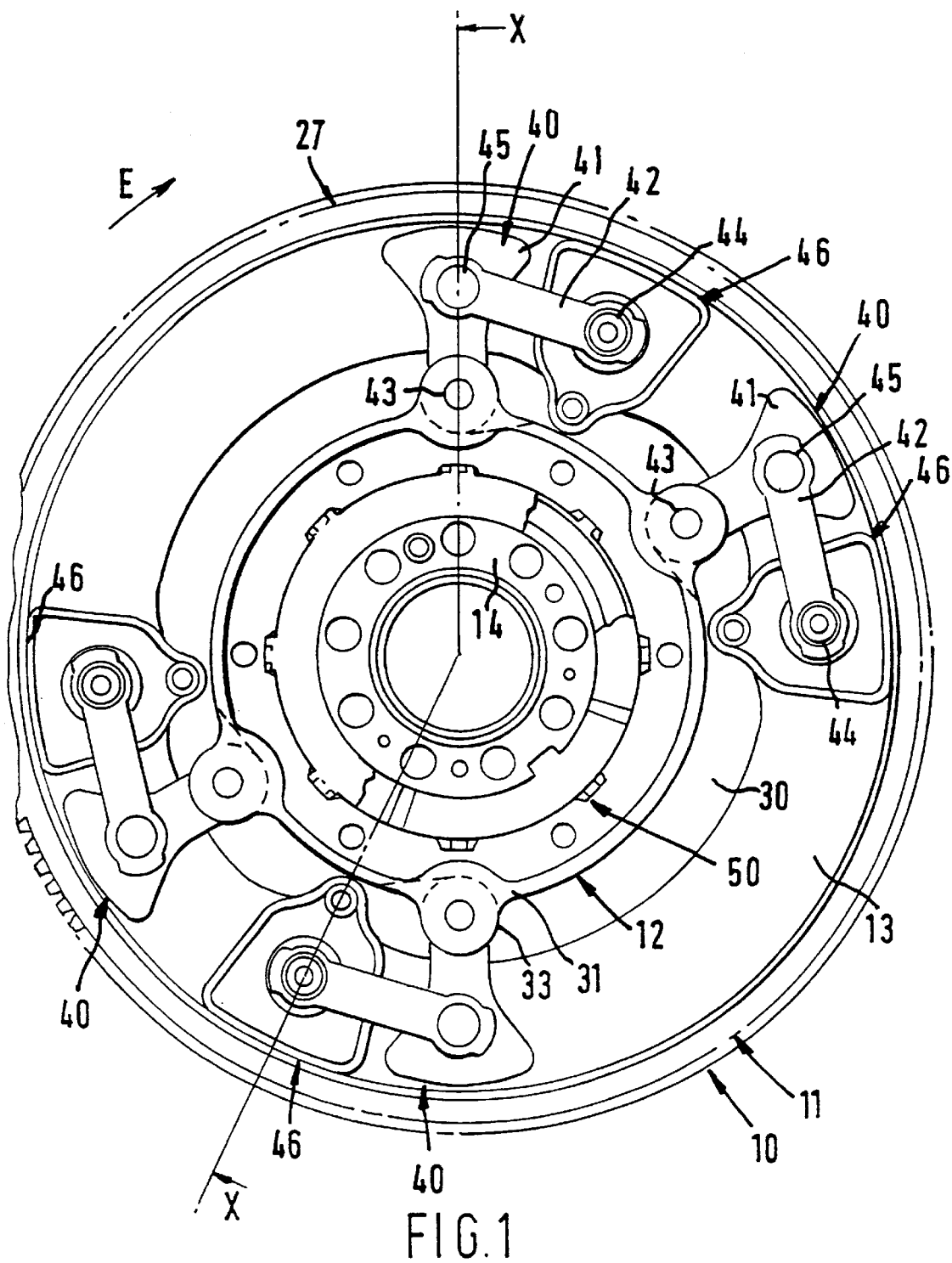
FIG. 1 is an axial partly cutaway view, taken in the direction of arrow A of FIG. 2 looking towards the associated clutch, of a twin mass flywheel in its geometrically neutral position which includes a friction damping device according to the present invention.
Figure 2:
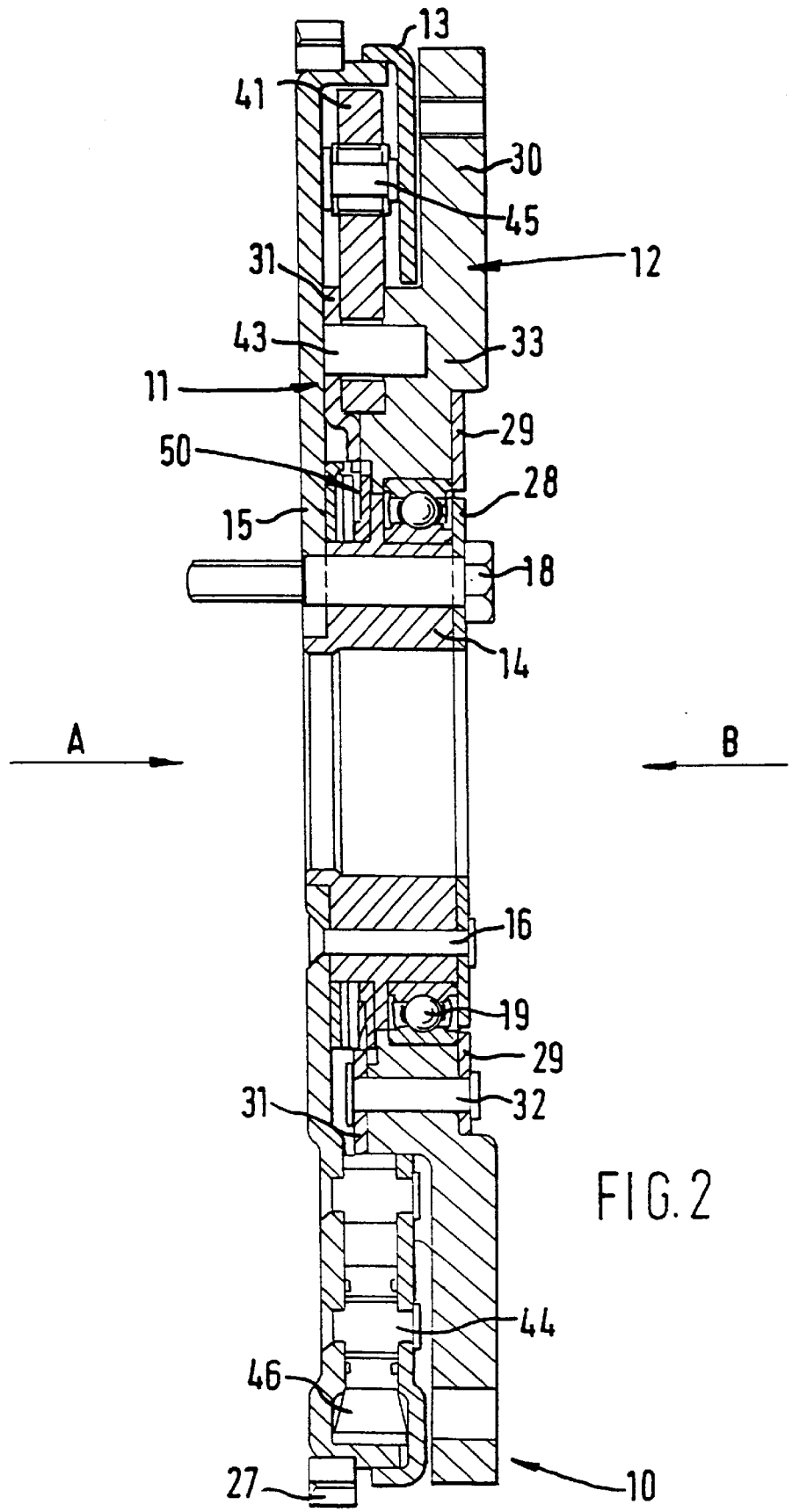
FIG. 2 is a radial cross-section taken along the line X—X of FIG. 1.

Under normal drive and over-run conditions the twin mass flywheel 10 rotates in an clockwise direction in the view shown in FIG. 1 as indicated by arrow E.

The flywheel mass 11 comprises the central hub 14, a main housing plate 15, a cover plate 13 and a starter ring 27 which is welded to the main housing plate 15. An inner bearing retaining plate 28 is fixed to the hub 14 by rivets 16 to retain a bearing 19 on which second flywheel mass 12 is mounted.

The second flywheel mass 12 comprises a flywheel plate 30 with an outer bearing retaining plate 29 and pivot plate 31 both fixed to the flywheel plate 30 by rivets 32.

Relative rotation between two flywheel masses 11 and 12 can take place and is Primarily controlled by a plurality of pivotal linkages 40, a plurality of torsion units 46, and by a friction damping device 50 according to the invention.

The operation of the pivoted linkages 40 is not part of the inventive concept of the current application. A full description an operation of the pivotal linkages can be found in the applicants prior GB Patent GB 2229793.

In summary pivotal linkage 40 comprises a first link 41 pivotally mounted between a centre hub portion 33 and pivot plate 31 of the flywheel mass 12 by way of a first pivot 43, and a second link 42 pivotally mounted on the flywheel mass 11 by way of a second pivot 44 via a torsion unit 46. The two links 41 and 42 are pivotally connected to each other by means of a third pivot 45. The first link 41 is formed as a bob weight mass having a greater mass at its end remote from the first pivot 43.

Relative rotation of the flywheel masses causes each linkage to adopt a different position to that shown in FIG. 1, but centrifugal forces acting on the linkage and the return bias effect of torsion units 46 tend to return the linkage to the position shown in FIG. 1.

The operation of the torsion units 46 is not part of the subject matter of this invention but, as indicated above, the torsion units resist pivoting of the links 42 about pivots 44. A full description of the operation of units 46 can be found in the applicants prior GB patent application 94 16891.1.

Figure 4:
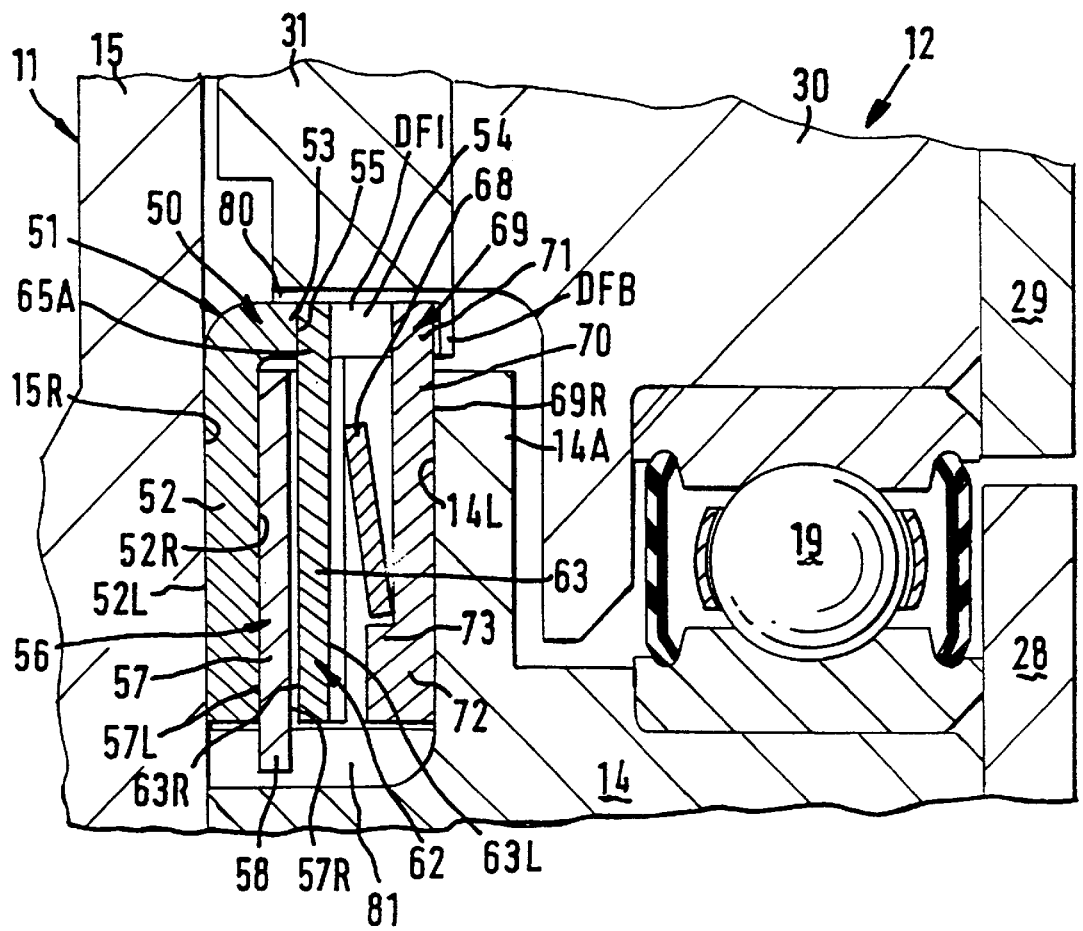
FIG. 4 is a large scale radial cross section taken along the line YY of FIG. 3.
Figure 5:
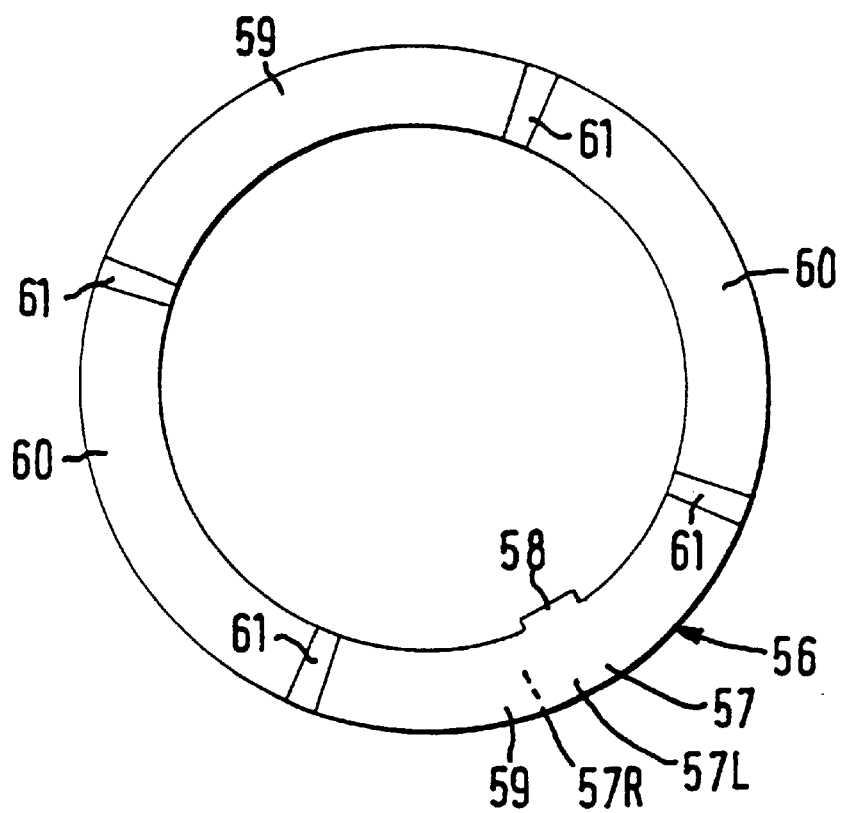
FIG. 5 is an axial view of a third friction member taken in the direction of arrow A of FIG. 2.
Figure 5A:
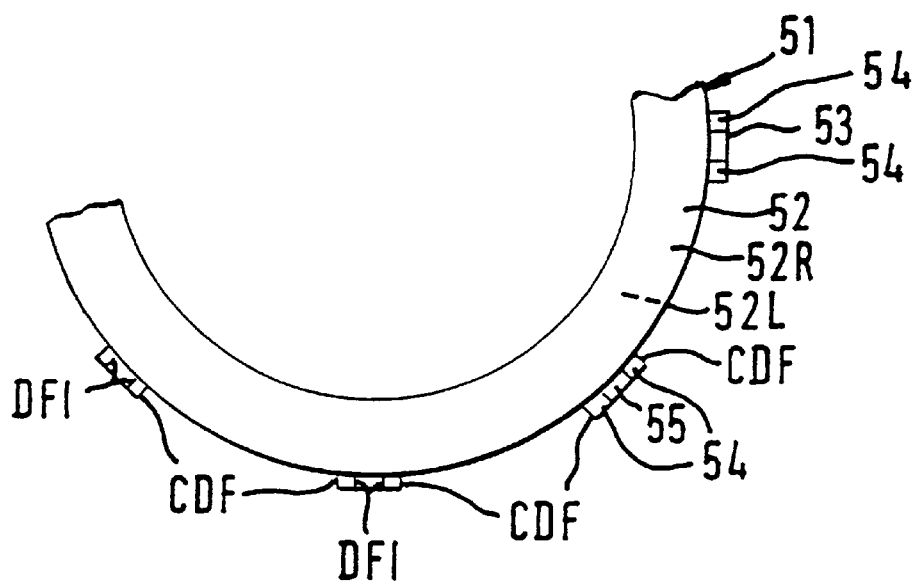
FIG. 5A is a partial axial view of a second friction member taken in the direction of arrow B of FIG. 2.
Figure 6:
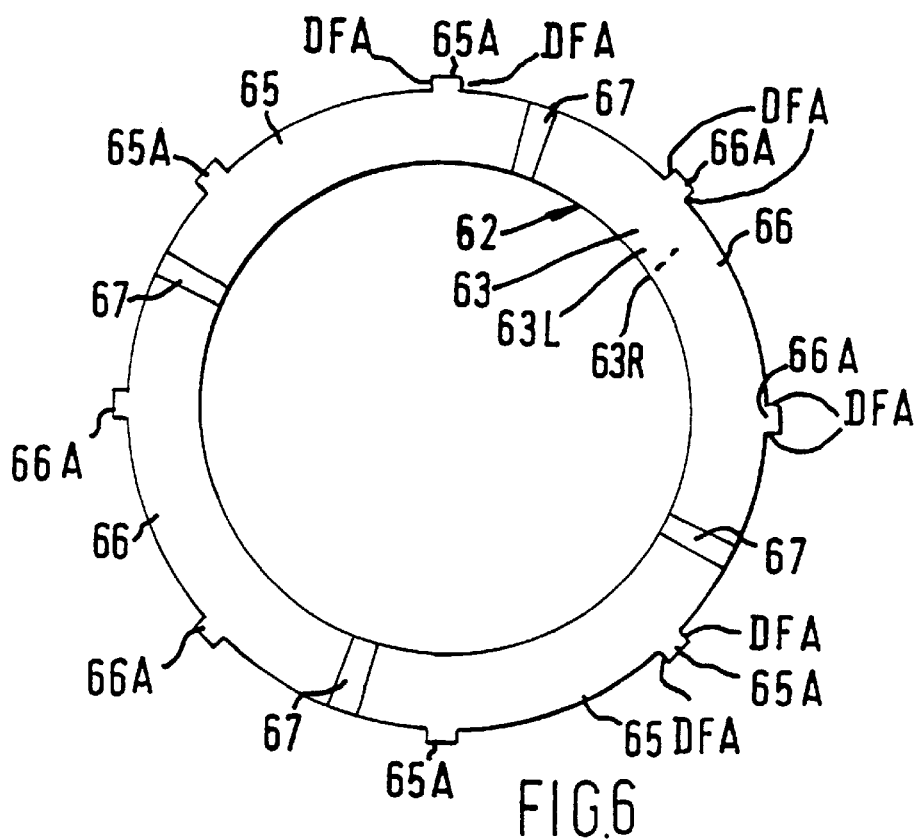
FIG. 6 is an axial view of a first friction washer taken in the direction of arrow A of FIG. 2.

The description and operation of the friction damping device 50 is as follows:

The friction damping device 50 comprises the following components arranged from left to right (when viewing FIG. 4) in the following order:

a) An annular surface 15R (see FIG. 4) on the main housing plate 15.

b) A friction member 51 (also known as a driven component and as a second friction member) (see FIG. 4 and 5A) which has a disc-like body 52 with surfaces 52R,52L, and a plurality of forked tabs 53. The forked tabs 53 are circumferentially spaced around the outer periphery of the disc-like body 52. The plane of the forked tabs 53 is at right angles to the plane of the disc-like body 52. Each forked tab has two prongs 54 and a fork root 55 (see FIG. 7). Each prong has an outer common drive formation CDF and a inner first drive formation DF1. It will be noted that a plane passing through the fork roots 55 is not coincident with surface 52R of the disc-like body 52 but offset in the direction of the extension of the prongs 54.

c) A friction member 56 (also known as a driving component and as a third friction member) (see FIGS. 4 & 5) which has an annular body 57 with left annular surfaces 57L and right annular surface 57R and a radially inwardly projecting peg 58. The annular body 57 is divided into two pairs of quadrants 59, and 60. Quadrants 59 are diametrically opposite each other and are co-planer with peg 58. Quadrants 60 are also diametrically opposite each other and are co-planer but axially off set from the plane of quadrants 59. Circumferentially adjacent quadrants are joined by angled ramps 61.

d) A friction member 62 (also known as a driven component and as a first friction member) (see FIGS. 4 & 6) similar to the third friction member 56 except that it has a plurality of pegs 65A, 66A which are radially outwardly projecting, and there is no radially inwardly projecting peg. Friction member 62 has an annular body 63 with left annular surface 63L and right annular surface 63R. The annular body 63 is formed as quadrants 65 and 66, joined by angled ramps 67, similar to their counterparts on the third friction member 56. Pegs 65A are co-planer with quadrants 65 and pegs 66A are co-planer with quadrants 66. Each peg 65A, 66A has first drive formations DFA.

e) A belleville spring 68 (see FIG. 4). In another embodiment a wavy washer (also known as a wave spring) could be used in place of the belleville spring 68.

f) A friction member 69 (also known as a driven component) (see FIG. 3 and 4) which has an annular body 70 and radially outwardly projecting pegs. 71 at the outer periphery of the annular body 70. Each pegs 71 has drive formations DFC. On the inner periphery of the annular body 70 there is a thickened portion 72 with a shoulder 73. On the right hand side of friction member 69 as viewed in FIG. 4 is an annular surface 69R.

g) An annular surface 14L, on the hub 14.

Figure 3:
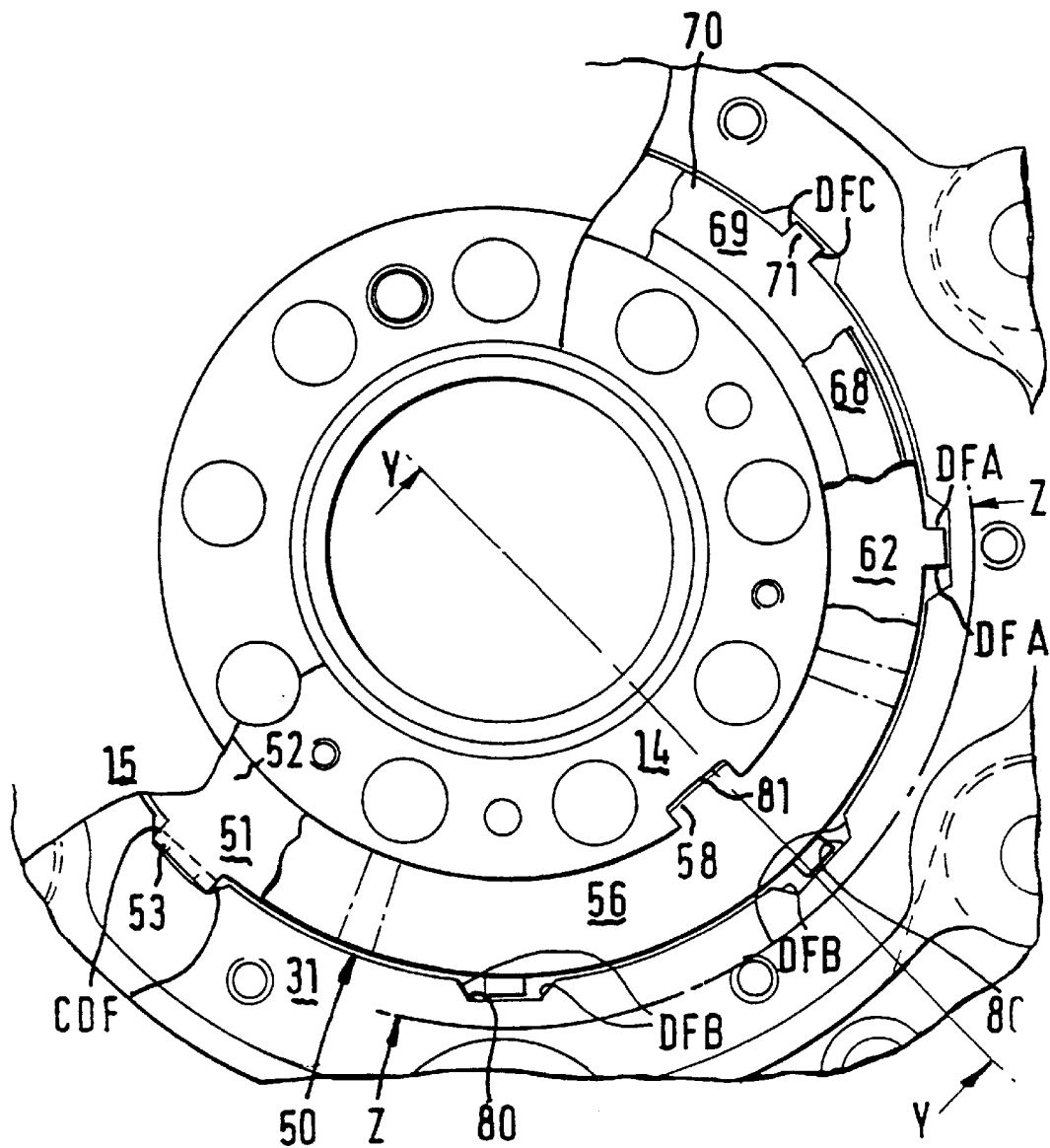
FIG. 3 is a larger scale view of part of FIG. 1 showing the friction damping device in greater detail.

With the twin mass flywheel 10 in its geometrically neutral position as shown in FIG. 1 (i.e. with the first and third pivots aligned with a radial plane of the twin mass flywheel 10) the components of the friction damping device 50 align as shown in FIGS. 3 and 4 and in particular:

a) The common drive formations CDF of the prongs 54 engage in drive formations DFB of flywheel mass 12. Drive formations DFB are in the form of slots 80 on pivot plate 31. This ensures that second friction member 51 is rotationally fast with pivot plate 31 of flywheel mass 12.

b) Peg 58 of the third friction member 56 engages rotationally fast in a slot 81 in hub 14.

c) The first friction member 62 is concentric and rotationally fast with the second friction member 51 since drive formations DFA of pegs 65A, 66A engage drive formations DF1 of second friction member 51. Furthermore the first friction member 62 abuts the fork root 55 on second friction member 51 only at pegs 65A.

Quadrants 59 and 60 on the third friction member 56 are aligned with quadrants 65 and 66 respectively on the first friction member 62 such that the third friction member 56 can axially float to a limited extent between the second friction member 51 and the fist friction member 62 i.e. quadrants 59 substantially align with quadrants 65 and quadrants 60 substantially align with quadrants 66 such that they are interleaved (see FIG. 7). It can be seen that those fork roots 55 which contact pegs 65A act as stops to limit the axial displacement of the first friction member 62 relative to the third friction member 56 and act to maintain the belleville spring 68 in a stressed condition (see below).

d) Belleville spring 68 is co-axial with and abuts the first friction member 62 and biases the first friction member to the left as viewed in FIGS. 4 and 7. The belleville spring is axially compressed and is in a stressed condition (as opposed to being completely unrestrained in an axial direction and in an unstressed condition).

e) Friction member 69 is co-axial with and abuts the belleville spring 68. The belleville spring 68 and friction member 69 are maintained in a co-axial position by the shoulder 73 abutting the inside edge of the belleville spring 68. The pegs 71 of friction member 69 engage between the prongs 54 of the second friction member 51. This ensures that friction member 69 is rotationally fast with the second friction member 51.

It will be appreciated that third friction member 56 is rotationally fast with housing plate 15, and hub 14, of input flywheel mass 11. Also second friction member 51, first friction member 62, belleville spring 68, and friction member 69 are rotationally fast with pivot plate 31, of output flywheel mass 12.

The belleville spring 68 biases the first friction member 62 into contact with the fork roots 55 of the second friction member 51 which in turn is biased into contact with annular surface 15R of the main housing plate 15. The belleville spring 68 also biases friction member 69 into contact with surface 14L of hub 14.

The friction damping device 50 has consecutive first, second and third ranges of relative rotation between the flywheel masses 11 and 12 in the drive and in the over-run directions.

During the first range of relative rotation in the drive or over-run directions the pegs 65A remain abutting adjacent fork roots 55 since the quadrants 59, 60 and 65, 66 remain respectively inter-leaved. Relative rotation of flywheel masses 11 and 12 within this first range causes an initial frictional damping force to be generated between annular surface 15R engaging with annular surface 52L and annular surface 14L engaging with annular surface 69R. The frictional damping force produces a frictional damping torque (dependant upon the radii of the friction generating surfaces 15R, 52L, 14L and 69R). The torque produced as a result of friction between surfaces 15R and 52L is transferred to flywheel mass 12 via the second friction member 51 and in particular by common drive formations CDF of the second friction member 51 being in contact with drive formations DFB of pivot plate 31.

The torque produced as a result of friction between surfaces 14L and 69R is transferred to flywheel mass 12 via drive formations DFC of friction member 69 being in contact with drive formation DF1 of the second friction member 51 and subsequently drive formation CDF of the second friction member 51 being in contact with drive formation DFB of pivot plate 31.

Thus drive formations DFC and DF1 only transfer the torque resulting from friction between surfaces 14L and 69R whilst drive formations CDF and DFB transfer the total torque resulting from friction between surfaces 14L and 69R and between surfaces 15R and 52L. This total friction damping torque is designed to cure problems associated with the engine running at idle speed such as gear idle chatter.

During the second range of relative rotation in the drive or over run direction (see FIG. 7A), corresponding angled ramps 61 and 67 on friction members 56 and 62 contact each other causing the first friction member 62 to be displaced to the right, in the direction of arrow K of FIG. 7A. Pegs 65A no longer contact fork roots 55. This causes the belleville spring 68 to bias the first friction member 62 against the third friction member 56 which in turn is biased against the second friction member 51. The second friction member 51 continues to be biased against the main housing plate 15.

Relative rotation of flywheel masses 11 and 12 within this second range generates additional frictional forces between second friction member 51 and third friction member 56 and between third friction member 56 and first friction member 62 in addition to the friction forces generated in the first range. All the initial and additional frictional forces increase as the angled ramps cause the belleville spring to compress further. The total frictional damping torque produced varies between that torque produced in the first range of relative rotation and that torque produced in the third range of relative rotation (see below).

During the third range of relative rotation in the drive or over run direction the top of the angled rands are reached and quadrant 60 contacts quadrant 65 (see of FIG. 7B). The total frictional damping torque generated by relative rotation of flywheel masses 11 and 12 within this third range does not vary, since relative rotation within this range does not vary the belleville spring's 68 length.

The total frictional damping torque generated in the second and third ranges is designed to be sufficient to limit problems associated with the drive or over run range of the twin mass flywheel 10.

Torque generated as a result of further friction surfaces engaging during the second and third range of relative rotation is transferred to the flywheel mass 11 via peg 58 of third friction member 56. The torque resulting from friction between second friction member 51 and third friction member 56 is transferred to the flywheel mass 12 via drive formations CDF and DFB. Torque resulting from friction between third friction member 56 and first friction member 62 is transferred to the flywheel mass 12 via drive formation DFA being in contact with the drive formation DF1 and subsequently through the common drive formation CDF being in contact with drive formation DFB.

It is apparent that during relative rotation of the twin mass flywheel there is relative axial movement between drive formation DFA and DF1 whilst torque is being transferred between these surfaces creating a potential wear problem of the drive formations. However since both second friction member 51 and first friction member 56 are relatively small, they can be made from material with relatively good wear properties (such as spring steel) without significant additional cost.

It is also apparent that no axial movement takes place between drive formations CDF and DFB and that the contact area between drive formations CDF and DFB is greater than the sum of contact areas between drive formations DFA and DFC with drive formation DF1. This provides for relatively low contact loads on the drive formation DFB and allows pivot plate 31 to be made from a material of relatively low strength such as mild steel.

It is apparent that this friction damping device 50 has a low frictional damping level over a first range of relative rotation of the flywheel masses 11 and 12, and has higher level of frictional damping over a second and third range of relative rotation. Furthermore the transition between consecutive ranges is smooth.

It is possible to tune the above friction damping device or other friction devices described later in the specification to give different levels of damping for different applications, for example:

i) The various components of the friction damping device could have different friction surface coatings e.g. Polytetrafluroethelene (PTFE), or a non-asbestos friction material e.g. product code B120 made by Raybestos GmbH, or a sintered material could be used.

ii) The belleville spring need not be initially stressed.

iii) It is possible to have more or less friction members.

iv) An additional set of ramps could be added to produce a fourth and fifth range of relative rotation.

v) A limited amount of rotation could take place between the contacting drive formations of appropriate components i.e. there could be lost motion between the components.

By modifying the circumferential position or angle of various ramps the duration and position of the first range, second range, and third range of relative rotation can be varied relative to the at rest position of the flywheel masses 11 and 12. In particular, it is not necessary for the friction damping device to enter the third range in the drive or over-run directions. Also the angle of relative rotation of the flywheel masses 11 and 12 between the geometrically neutral position and the start of the second range in the drive direction can be different to that angle between the at rest position and the start of the second range in the over-run direction.

Also it is possible for the friction damping device to create a greater or smaller frictional damping force in the third range in the drive direction than in the over-run direction, for example by ensuring the drive ramp surfaces have different heights to the over-run ramp surfaces.

FIG. 8a shows a modified friction damping device 50' similar to friction damping device 50, the main differences being:

a) second friction member 51' has friction material bonded to both axial sides of annular portion 52' b) prongs 54' extend beyond the drive formations DFB' of pivot plate 31' into a recessed area 30A' of flywheel plate 30'. Flywheel plate 30' has no drive formations in the recessed area 30A' thus all the torque produced by the friction damping device is transfered to flywheel mass 12' via pivot plate 31'. This arrangement is advantageous since it is relatively easy to produce drive formations DFB in the relatively thin pivot plate 31' by a single through piercing operation. However such a single through piercing operation on the flywheel plate 30' would be harder to accomplish and would significantly weaken the bearing flange 30B' and bearing outer race housing 30C'. The twin mass flywheel 10' is therefore axially compact with an output flywheel 12' primarily in two parts, namely pivot plate 31' and flywheel plate 30', only one part of which (pivot plate 31') has drive formations and the axially orientated portions of the second friction component extend with clearance into a recess of the other part (flywheel plate 30').

c) pegs 65A' do not contact fork root 55'
d) belleville spring 68' is initially unstressed
e) friction member 69' has friction material bonded to one axial side.

It can be adventagous to use friction material in friction damping devices, in particular it provides a more constant coefficient of friction and hence the friction force and friction torque vary less with use.

FIG. 8B shows a modified friction damping device 50" similar to friction damping device 50', the main differences being:

a) second friction damping member 51" has a ramped annular portion 52"
b) third friction damping member 56" has corresponding ramps which contact the ramps on the second friction damping member 51"
c) first friction damping member 62" is not ramped and has friction material bonded to each axial side
d) friction member 69" is rotationally fast with the hub 14" and is adjacent the first friction member 62"
e) the belleville spring 68" is between the friction member 69" and the hub flange 90" and therefore rotates with flywheel mass 11".

FIG. 9 shows a modified second friction member 51''' similar to second friction member 51' except there are additional drive formations 91 which are orientated axially in the opposite direction to the fork prongs 54''' and engage with drive formations 92A of a friction member 92. Friction member 92 has a friction material 93 bonded to one axial side.

It should be noted that friction member 92 is flat and has no ramps or axially orientated drive formations and this can be advantageous when bonding on a friction material.

Thus the torque produced by friction material 93 is transferred to friction member 92 and then to the second friction member 51 via the additional drive formations.

This arrangement advantageously provides a friction material which is rotationally fast with the second component 51''', but which has advantageously been applied to a flat component (friction member 92).

FIG. 10 shows a further form of friction damping device 150 similar to friction damping device 50 but the prongs 154 of the second friction member 151 have their ends deformed at 154A to create a sub assembly of the friction member 69, belleville spring 68, and the first, second and third friction members 62, 151, 56 prior to assembly of the friction damping device 150 into the twin mass flywheel.

FIG. 11 shows another form of friction damping device 250 similar to friction damping device 50 but the prongs 254 on the second friction member 251 are resilient and have hooked ends 254A. The resilient nature of the prongs 254 enables the friction damping device 250 to be clipped together as a sub assembly prior to assembly of the friction damping device 250 into the twin mass flywheel.

FIG. 11a shows a still further form of friction damping device 250' similar to damping device 250 except the axial distance q between the outermost surfaces of the sub-assembly is less than the distance Q between the appropriate adjacent surfaces on housing plate 15 and central hub 14. It is apparent that in this embodiment substantially no frictional damping torque is generated in a first range of relative rotation of the associated flywheel masses and this can be advantageous in some circumstances.

FIGS. 12 to 16 show another form of friction damping device 450 installed in a twin mass flywheel 410 which rotates about an axis N—N (FIG. 12).

Friction damping device 450 comprises:

a) Friction member 415A which comprises a friction material 415B which is bonded to a thrust plate 415C. Friction member 415A is rotationally fast with the main housing plate 415 via pegs 415D which engage projections 415E pressed out of housing plate 415.

b) A friction member 451, with a disc-like body 452 with right and left surfaces 452R and 452L respectively and a plurality of tabs 453. Friction member 451 is axially slidable but rotationally fast with pivot plate 431 via tabs 453 being in engagement with drive formation 431A of pivot plate 431.

c) A friction member 400 (also known as a second friction member) which is rotationally fast on hub 414 via eight forks 400C and in particular common drive formations 4CDF of forks 400C being in engagement with drive formation in the form of 8 axial slots 481 in hub 414. Friction member 400 has two friction facings 400A and 400B fixed to it, one on either axial side. Friction facings 400A and 400B have annular surfaces 400L and 400R respectively.

d) A friction member 462 (see FIG. 14) (also known as a third friction member) which is rotationally fast with pivot plate 431 via external tabs 462A engaging in drive formations 431A (see FIG. 12). Third friction member 462 is similar in construction to first friction member 62 but has two sets of eight sectors 465, 466 joined via two sets of eight angled ramps 467 in place of the 4 quadrants and 4 ramps of first friction member 62. Friction member 462 has right and left annular surfaces 463L and 463R respectively.

e) A friction member 456 (also known as a first friction member) which has an annular body 457 and circumferentially spaced ramps in the form of radial ribs 460L on a first axial side (see FIGS. 12, 13, 15, and 16).

On a second axial side of friction member 456 substantially axially opposite radial ribs 460L there are eight circumferentially spaced pairs of tabs 401.

Also on the second axial side of the first friction washer there are eight circumferential arcuate ribs 402.

f) A belleville spring 468 (also known as a first friction member), which biases the components of the friction generating device into engagement, with eight external fingers 468A and eight internal fingers 468B. Each external finger 468A engages between a pair of tabs 401 with minimal circumferential clearances. It is apparent that the external fingers 468A when engaged with the tabs 401 ensure that the first friction washer 456 is concentric and rotatably fast with the belleville spring 468.

The internal fingers 468B are arranged to engage in the fork 400C of second friction member 400 with minimal circumferential clearances such that the belleville spring 468 is rotationally fast and concentric with hub 414. It follows that first friction plate 456 is therefore also rotationally fast and concentric with hub 414. The belleville spring 486 has a left axial surface 486L and a right axial surface 468R and for this example is assumed to always operate as a rising rate spring (although further embodiments may have it acting as a constant rate or falling rate spring within its deflection range).

In an alternative construction the belleville spring may have only one or two external fingers 468A or only one or two internal fingers 468B which would ensure that friction member 456 was rotatably fast but not necessarily concentric with the hub 414.

In the geometrically neutral position of the flywheel masses 411,412 the belleville spring 486 is axially stressed and the left axial surfaces 468L contacts the first friction washer 456 at outer contact radius T and the right axial surface 468R contacts the hub flange 414A at inner contact radius t. The ratio of T to t is known as the belleville ratio and is greater than unity. It will be noted that the circumferential arcuate ribs 402 are radially between the outer and inner contact radii T and t.

The friction damping device 450 has consecutive first, second and third ranges of relative rotation between the flywheel masses 411 and 412 similar to the first, second and third ranges of friction damper 50. However as axial movement of friction member 456 relative to third friction member 462 occurs as a result of relative rotation of the flywheel masses 411 and 412 and because the internal fingers 468B of the belleville spring 468 are curved as shown in FIG. 12, the inner contact radius t increases as the curved portions of the internal fingers roll on the hub flange 414A. This causes a progressive reduction in the belleville ratio which results in a force vs deflection characteristic of the spring which is different from that obtained were the spring to operate with a fixed belleville ratio. This can be advantageous in certain operating situations.

Further axial movement of the friction member 456 away from the third friction member 462 causes the circumferential arcuate ribs 402 to contact the belleville spring 468.

This has the effect of suddenly reducing the outer contact radius T and therefore causing a step reduction in the belleville ratio.

This step change in belleville ratio can also be particularly advantageous when tuning the friction device for a particular application.

It will be appreciated that a progressive change in belleville ratio can be achieved in ways other than curving the belleville internal fingers 468B. For example, the belleville external fingers 468A could be curved as shown in FIG. 12A or the hub flange 414A could be curved as shown in FIG. 12B. Also a step change in belleville ratio can be achieved by means other than circumferential arcuate ribs on the first friction washer 456. For example, circumferential arcuate ribs on one or other axial side of the belleville spring 468 or on the hub flange 414A could achieve this result.

It should be noted that axial movement of the friction member 456 causes the belleville to substantially move axially, however there is also an element of rotation of the belleville spring and in particular the rubbing contact between the internal fingers 468B and the fork 400C is primarily a rotating movement.

Also the torque produced by friction member 456 is transferred to belleville spring 468 and then to the forks 400C of the second friction member 400 and is finally transferred to hub 414 via the common drive formations 4CDF of the second friction member 400. The torque produced by the second friction member 400 is also transferred to the hub 414 via common drive formations 4CDF. The advantages of this embodiment are similar to the advantages of friction damping device 50 and in particular it allows friction damping members 400 and 486 to be made of a relatively hard material such as spring steel, and the hub 414 can be made of a relatively soft material such as mild steel.

In an alternative construction it is possible to have a belleville spring with common drive formations which acts as the second friction member.

An alternative way of defining the present invention is to describe friction member 462 as a secondary friction component and to describe friction member 456 as a primary friction component from which the friction damping force is transferred via the bias spring 468.

A further alternative way of defining the present invention is to describe friction member 462 as a second ramped component and to describe friction member 456 as a first ramped component which are biased into engagement by belleville spring 468 whose belleville ratio changes as the ramped components rotate relative to each other during relative rotation of the associated flywheel masses.

With reference to FIGS. 17 to 21 of the accompanying drawings there is illustrated a still further form of friction damping device 650 as used in a twin mass flywheel 610. Twin mass flywheel comprises two flywheel masses 611 and 612.

One flywheel mass 611 is fixed to a crankshaft of an internal combustion engine (not shown) by way of a central hub 614 and bolts (not shown) which pass through holes 618A. In use a friction clutch (not shown) is secured to the second flywheel mass 612 to connect the second flywheel mass 612 with an associated gearbox (not shown). Under normal drive and over-run conditions the twin mass flywheel 610 rotate in a anti-clockwise direction in the view shown in FIG. 17 as indicated by the arrow M.

The flywheel mass 611 comprises the hub 614 which is fixed to the crankshaft and first annular plate 615 fixed to the hub 614 by rivets 616 and a cover plate 613 fixed to the first annular plate 615.

The flywheel mass 611 further comprises. A pair of annular sheet steel side plates 626 and 627 located between annular plate 615 and cover plate 613. The side plates 626 and 627 are mirror images of each other, and the side plate 627 is shown in FIGS. 19 and 19A. The side plate 626 adjacent the first annular plate 615 is fixed thereto by pegs (not shown) that engage holes 620 spaced around the outer periphery of each side plate 626, 627.

Side plate 627 is axially spaced from side plate 626 by circumferentially spaced axially inwardly indented areas 621 on each side plate which abut each other. The two side plates 626 and 627 can be secured together by spot welding, or by screw fasteners, rivets etc. in the abutting areas.

The second flywheel mass 612 comprises a plate 612A, a hub part 630 and a pair of annular flange plates 631,632, all secured together by spaced rivets 637.

The two flange plates 631,632 are mirror images of each other and one flange plate 631 is shown in FIG. 20. The two flange plates 631 and 632 each have a radially inner annular portion 635 with two diametrically opposed radially extending lugs 636 thereon which are formed axially off set from the annular portion 635 so that when the two plates 631 and 632 are secured back-to-back on the hub part 630 by rivets 637 the aligned lugs 636 on each plate 631 and 632 abut. Each lug 636 has abutment faces 636A and 636B and lug portion 636C.

In an alternative construction it is possible to have a single flange plate which perform the same function as the pair of flange plates 631, 632.

The second flywheel mass 612 is mounted rotatably to the first flywheel mass 611 by way of the bearing 619. The bearing 619 is non-rotatably mounted on the hub 614 and is secured in place between a flange 614A on the hub and an annular plate 628. The outer race of the bearing 619 is non-rotatably mounted by an interference fit in the centre of the second flywheel mass 612.

Relative rotation between the two flywheel masses 611 and 612 is controlled primarily by a plurality of pivotal linkages 640 and by a friction damping device 695. Also springs 660, first resilient means 670, second resilient means 680, cushioning means 690, and two friction damping devices 650 according to the present invention assist in controlling various specific ranges of relative rotation of the flywheel masses 611 and 612.

The pivotal linkages 640 operate in a similar manner to pivotal linkages 40 of twin mass flywheel 10, with first link 641 (formed as a bob weight mass), second link 642 and first, second and third pivots 643,644, and 645 corresponding to first link 41, second link 42 and first, second and third pivots 43,44 and 45 respectively.

FIG. 17 shows the linkages in their centrifugally neutral position, that is with the centre of gravity CG of each first link 641 and the corresponding first pivot 643 aligned on a radial plane of the twin mass flywheel 610. This is the position adopted when the twin mass flywheel is rotating and not transmitting any torque.

Each friction damping device 650 (see FIG. 21) comprises a resilient clip 651 which is U-shaped in cross section with a base portion 652 and two curved arm portions 653. The base portion is fixed to a first spring seating 622 by rivet 663. First spring seating 622 is located at one circumferential end of a spring recess 628 in side plates 626, 627 and is held rotationally fast with flywheel mass 611 by the action of the stressed spring 660 reacting against a second spring seating 623 which interacts against the other circumferential end of spring recess 628 when the flywheel 610 is in an at rest position.

Each outside face 653A of arm portions 653 contacts the axially inner surface of either side plates 626 or side plate 627.

Each friction damping device 650 further comprises surfaces 636C on lugs 636.

Relative rotation in the drive direction between flywheel masses 611 and 612 will cause the abutment faces 636A on lugs 636 to approach their corresponding second spring seatings 623. In certain circumstances further relative rotation of the flywheel masses 611 and 612 in the drive direction will cause contact between the abutment faces 636A and the second spring seatings 623 which causes the springs 660 to be compressed and subsequently lug portions 636C to enter between corresponding arm portions 653 of clips 651 and contact surfaces 653B.

Further relative rotation of the flywheel masses 611 and 612 in the drive direction will cause the abutment faces 636B to compress a rubber block type resilient means 670, which are also carried on the first spring seatings 622, until abutment faces 636B contact rivet 663 and relative rotation of the flywheel masses 611 and 612 stops.

Relative rotation of the flywheel means 611 and 612 in the over-run direction will cause abutment faces 636D to approach resilient means 680. Resilient means 680 are positioned in recesses 629 of side plates 626 and 627. In certain circumstances further relative rotation of the flywheel masses 611 and 612 in the over-run direction will cause the resilient means 680 to be compressed until the compression load of the resilient means 680 equals the force being applied to it by abutment surface 636D, where upon the relative rotation of the flywheel masses 611 and 612 stops.

Relative rotation of the flywheel masses 611,612 is therefore ultimately limited by a solid drive stop (rivet 663) and a cushioned over-run stop (resilient means 680).

Alternative constructions could have a solid or a cushioned stop for either drive or over-run direction which stops could be mounted on either flywheel mass. At the position of relative rotation when the two flywheel masses are limited by the drive stops the lobe 641A of each bob weight 641 is very near a corresponding part of the hub 614. Adverse manufacturing tolerances may make one or more of these lobes 641A contact a corresponding part of the hub with consequent noise. The cushioning means 690 mounted on each bob weight prevents any such noise and also ensures the linkage does not go over centre i.e. the pivot 645 does not pass through a line joining the pivots 643 and 644. Further embodiments may provide the cushioning means mounted on the hub portion and may also provide hub or bob weight mounted cushioning means to prevent bob weight to hub contact at the position of relative rotation when the two flywheel masses are limited by the over-run drive stop.

In a further construction friction damping device 695 could be replaced by a friction damping device such as 50 or 50' according to the present invention.

With reference to FIG. 22 of the accompanying drawings there is illustrated a still further friction damping device 750.

Relative rotation of flywheel masses 711 and 712 in the drive direction will cause the resilient clip 752 to enter between corresponding radially spaced surfaces 736C. This causes:—a) the friction surfaces 770 of the clip 752 to be displaced along a radial line towards each other, b) both the first surfaces 770 to be displaced relative to their corresponding flywheel mass 711 and c) a friction damping force to be developed.

It is apparent that a combination of features of friction damping devices 650 and 750 can produce further constructions in which two friction surfaces of a resilient clip could be displaced along a radial line away from each other or two friction surfaces of a resilient clip could be displaced axially towards each other.

What is claimed is:

1. A twin mass flywheel having a friction damping device for controlling the relative rotation of a first and second flywheel mass of the twin mass flywheel, the friction damping device comprising a resilient U-shaped clip having a base portion and two arm portions which clip is fixed rotationally fast with one of said flywheel masses, and a flange fixed rotationally fast with the other of said flywheel masses, the arrangement being such that after said first and second masses have moved through a first pre-determined range of relative rotation, the flange is brought into contact with the arms of the U-shaped clip to generate a friction damping force.

2. A twin mass flywheel as claimed in claim 1 in which each arm portion has an inner and an outer surface and the flange contacts the inner surfaces of the arm portions.

3. A twin mass flywheel as claimed in claim 1 in which each arm portion has an inner surface and an outer surface and the flange contacts the outer surfaces of the arm portions.

4. A twin mass flywheel having a friction damping device capable of generating friction torque for controlling the relative rotation of a first and a second flywheel mass of the twin mass flywheel, the friction damping device comprising a first and a second friction member rotationally connected with an associated one of the flywheel masses, a third friction member sandwiched between the first and second friction members and which is rotationally connected with the other flywheel mass, and actuating means operative to axially displace the first and second friction members relative to each other to modify the friction generated by the device upon rotation of the third friction member relative to the first and second friction members, the second friction member having a plurality of first axially orientated portions operatively connected with the first friction member, each first axially orientated portion being in the form of a pronged fork with the circumferentially outer surfaces of the prongs acting as a common drive formation for connecting the first and second friction members with said one flywheel mass by drivingly engaging torque transmitting abutments rotationally fixed with said one flywheel mass with formations on the first friction member engaging between the prongs of the second friction member.

5. A twin mass flywheel as defined in claim 4 in which the second friction member has further second axially orientated portions, orientated in the apposite axial direction to the first portions and which comprises further drive formations for the connection of additional friction members with the second friction member.

6. A twin mass flywheel as defined in claim 4 in which the material of the second friction member is a relatively hard material when compared with a material of the associated flywheel.

7. A twin mass flywheel according to claim 4 in which said associated one flywheel mass comprises a first part and a second part, the first part being operatively connected directly with the second friction member via each axially orientated portion, each axially orientated portion extending with clearance into a recess formed in the second part of the associated one flywheel.

8. A twin mass flywheel as defined in claim 4 in which the axil movement of the first friction member relative to the second friction member is as a result of contact between ramps on adjacent friction members.

9. A twin mass flywheel as defined in claim 8 in which the ramps are arranged to vary the friction damping torque produced from a first level in a first range of relative rotation of the flywheel masses to a second level different from the first level in a second range of relative rotation of the flywheel masses.

10. A twin mass flywheel as defined in claim 8 in which the ramps are provided on the first and third friction members.

11. A twin mass flywheel as defined in claim 8 in which the ramps are provided on the second and third friction members.

12. A twin mass flywheel as defined in claim 4 in which a spring biases the friction members into engagement, the spring also action to transfer the friction damping torque generated by the first friction member to the common drive formation.

13. A twin mass flywheel as defined in claim 4 in which there are further friction members operatively connect with the respective flywheel masses so that the device is a multi-plate friction damping device.

14. A twin mass flywheel as defined in claim 4 in which the second friction member can rotate to a limited extend relative to the first friction member or relative to the associated flywheel.

15. A twin mass flywheel as defined in claim 4 in which at least the first, second and third friction members are build as a pre-assemble sub-unit for insertion as a single unit into the twin mass flywheel during assembly of the twin mass flywheel.

16. A twin mass flywheel as defined in claim 15 in which the pre-assembled sub-unit includes an axially pre-stressed bias means and upon insertion of the single unit into the twin mass flywheel no additional axial compression of the bias means occurs.

17. A twin mass flywheel as defined in claim 15 in which the components comprising the pre-assembled sub-unit are retained as a sub-unit by formations on the ends of each first axially orientated portion.

18. A twin mass flywheel having a first flywheel mass and a second flywheel mass arranged for limited relative rotation about a common axis, a first damper means connected between said flywheel masses and arranged to oppose relative rotation of said flywheel masses and arranged to transmit driving torque therebetween, a second damper means connected between said flywheel masses in parallel with the first damper means, said second damper means comprising a friction device having a first friction member rotationally connected with one of the flywheel masses and a second friction member rotationally connected with the other flywheel mass, said friction members being axially biased into frictional engagement with each other to generate a friction damping torque to resist relative rotation of said flywheel masses, a first ramp surface rotatable with the second flywheel mass, said co-operating ramp surfaces being arranged in response to relative rotation of said flywheel masses to vary the axial bias force and so to change the level of friction damping force generated, the arrangement being such that the flywheels can move through a first predetermined range of relative rotation before the co-operating ramp surfaces are brought into contact to change the level of friction damping force generated.

19. A twin mass flywheel as defined in claim 18 in which the co-operating ramp surfaces are arranged to vary the friction damping force produced by the damper from a first level in the first predetermined range of relative rotation of the flywheel masses to a second level different from the first during a second range of relative rotation in which the ramp surfaces are in contact.

20. A twin flywheel masses as defined in claim 19 in which the flywheels can rotate through a third range of relative rotation after the ramp surfaces have fully traversed each other, the friction damping force remaining substantially constant at said second level throughout the third range of relative rotation.

21. A twin mass flywheel as defined in claim 18 in which the variation in friction damping force produced by the co-operating ramp surfaces in response to relative rotation of the flywheel masses in a first direction is different to the variation in the friction damping force produced by the co-operating ramp surfaces in response to relative rotation of the flywheel masses in a second direction opposite to the first.

22. A twin mass flywheel having a first flywheel mass and a second flywheel mass arranged for limited relative rotation about a common axis, a first damper means connected between said flywheel masses and arranged to oppose relative rotation of said flywheel masses and arranged to transmit driving torque therebetween, a second damper means connected between said flywheel masses in parallel with the first damper means, said second damper means comprising a friction device having first and second friction members rotationally connected with an associated one of the flywheel masses, a third friction member sandwiched between the first and second friction members and which is rotationally connected with the other flywheel mass, and actuating means operative as a result of relative rotation of the flywheel masses to axially displace the first and second friction members relative to each other to modify the friction generated by the device upon rotation of the third friction member relative to the first and second friction members, the actuating means comprising co-operating ramp surfaces defining at least two consecutive ranges of relative rotation of the flywheel masses such that in at least one of the ranges the third friction member is not axially loaded and does not contribute to any friction damping torque produced in that range.

23. A twin mass flywheel having a friction damping device for controlling the relative rotation of a first and second flywheel mass of the twin mass flywheel, the friction damping device comprising a first friction component which rotates with the first flywheel mass and a second friction component which rotates with the second flywheel mass, the first and second friction components being biased into engagement to generate a friction damping force by a Belleville spring and having co-operating surface formations arranged such that during relative rotation of the flywheel masses the level of compression of the Belleville spring is varied, a first surface of the Belleville spring contacting a surface of a first adjacent component at an outer contact radius and a second surface of the Belleville spring contacting a surface of a second adjacent component at an inner contact radius, at least one of the contacting surfaces of the Belleville spring being curved so that the ratio of the outer contact radius to the inner contact radius changes as the level of compression of the Belleville spring is varied the Belleville spring comprising a plurality of radially external fingers which contact the first adjacent component at the outer contact radius and a plurality of radially internal fingers which contact the second adjacent component at the inner contact radius.

24. A twin mass flywheel according to claim 23 in which the radially internal fingers are curved.

25. A twin mass flywheel according to claim 23 in which the external fingers are curved.

26. A twin mass flywheel having a friction damping device for controlling the relative rotation of a first and a second flywheel mass of the twin mass flywheel, the friction damping device comprising a first friction component which rotates with the first flywheel mass and a second friction component which rotates with the second flywheel mass, the first and second friction components being biased into engagement to generate a friction damping force by a belleville spring and having cooperating surface formations arranged such that during relative rotation of the flywheel masses the belleville spring is compressed, a first surface of the belleville spring contacting an associated surface of a first adjacent component at an outer contact radius and a second surface of the belleville spring contacting an associated surface of a second adjacent component at an inner contact radius, at least one of the contacting surfaces being provided with protrusions which are brought into contact with an associated other of the contacting surfaces during compression of the belleville spring such that the ratio of the outer contact radius to the inner contact radius undergoes a step change after a predetermined amount of relative rotation of the two flywheel masses.

27. A twin mass flywheel according to claim 26 in which the protrusions comprise a plurality of arcuate ribs provided on the surface of the first adjacent component axially proximal to the belleville spring the ribs being positioned between the outer contact radius and the inner contact radius such that they contact the first surface of the belleville spring after a predetermined amount of relative rotation of the flywheel masses thereby suddenly reducing the outer contact radius to provide for the step change in the ratio of the outer contact radius to the inner contact radius.

28. A twin mass flywheel having a friction damping device for controlling the relative rotation of a first and second flywheel mass of the twin mass flywheel, the friction damping device comprising a first friction component which rotates with the first flywheel mass, the first and second friction components being biased into engagement to generate a friction damping force by a Belleville spring and having co-operating surface formations arranged such that during relative rotation of the flywheel masses the level of compression of the Belleville spring is varied, a first surface of the Belleville spring contacting a surface of a first adjacent component at an outer contact radius and a second surface of the Belleville spring contacting a surface of a second adjacent component at an inner contact radius, the surface of the second adjacent component at the inner contact radius being curved so that the ratio of the outer contact radius to the inner contact radius changes as the level of compression of the Belleville spring is varied the Belleville spring comprising a plurality of radially external fingers which contact the first adjacent component at the outer contact radius and a plurality of radially internal fingers which contact the second adjacent component at the inner contact radius.

29. A twin mass flywheel as defined in claim 23 in which at least one of the contacting surfaces is provided with protrusions which are brought into contact with an associated other of the contacting surfaces during compression of the belleville spring such that the ratio of the outer contact radius to the inner contact radius undergoes a step function change after a predetermined amount of relative rotation of the two flywheel masses.

* * * * *